US008422758B1

(12) United States Patent
Bueche, Jr.

(10) Patent No.: US 8,422,758 B1
(45) Date of Patent: Apr. 16, 2013

(54) SYSTEMS AND METHODS OF CHECK RE-PRESENTMENT DETERRENT

(75) Inventor: Michael Patrick Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 844 days.

(21) Appl. No.: 12/202,781

(22) Filed: Sep. 2, 2008

(51) Int. Cl.
*G06K 9/00* (2006.01)
*G06K 9/36* (2006.01)

(52) U.S. Cl.
USPC ........... 382/139; 382/137; 382/138; 382/140; 382/284

(58) Field of Classification Search .......... 382/137–140, 382/284
See application file for complete search history.

(56) References Cited

U.S. PATENT DOCUMENTS

| 3,341,820 | A | 9/1967 | Grillmeier, Jr. et al. |
| 3,576,972 | A | 5/1971 | Wood |
| 3,593,913 | A | 7/1971 | Bremer |
| 3,620,553 | A | 11/1971 | Donovan |
| 3,648,242 | A | 3/1972 | Grosbard |
| 3,800,124 | A | 3/1974 | Walsh |
| 3,816,943 | A | 6/1974 | Henry |
| 4,002,356 | A | 1/1977 | Weidmann |
| 4,060,711 | A | 11/1977 | Buros |
| 4,070,649 | A | 1/1978 | Wright, Jr. et al. |
| 4,128,202 | A | 12/1978 | Buros |
| 4,136,471 | A | 1/1979 | Austin |
| 4,205,780 | A | 6/1980 | Burns |
| 4,264,808 | A | 4/1981 | Owens |
| 4,305,216 | A | 12/1981 | Skelton |
| 4,321,672 | A | 3/1982 | Braun |
| 4,433,436 | A | 2/1984 | Carnes |
| 4,454,610 | A | 6/1984 | Sziklai |
| RE31,692 | E | 10/1984 | Tyburski et al. |
| 4,523,330 | A | 6/1985 | Cain |
| 4,636,099 | A | 1/1987 | Goldston |

(Continued)

FOREIGN PATENT DOCUMENTS

EP 0 984 410 A1 3/2000

OTHER PUBLICATIONS

Matthews, Deborah, "Advanced Technology Makes Remote Deposit Capture Less Risky", Indiana Bankers Association, Apr. 2008, 2 pgs.

(Continued)

*Primary Examiner* — Bhavesh Mehta
*Assistant Examiner* — Utpal Shah
(74) *Attorney, Agent, or Firm* — Brinks Hofer Gilson & Lione

(57) ABSTRACT

A user or a device may separate a check into two or more portions prior to generating a digital image of the check for remote deposit of the check. The user or a device may separate the check by cutting or tearing the check. After separating the check into the portions, the user may generate a digital image of the portions of the check using a scanner for example. The digital image may be transmitted to an institution for deposit of the check. The institution may retrieve the images of the portions of the check and generate an image of the check based on the portions, by combining the images of the portions for example. The image of the check that may be generated based on the images of the portions may be processed for deposit.

21 Claims, 6 Drawing Sheets

U.S. PATENT DOCUMENTS

| | | | |
|---|---|---|---|
| 4,640,413 A | 2/1987 | Kaplan | |
| 4,644,144 A | 2/1987 | Chandek | |
| 4,722,444 A | 2/1988 | Murphy | |
| 4,722,544 A | 2/1988 | Weber | |
| 4,727,435 A | 2/1988 | Otani et al. | |
| 4,774,663 A | 9/1988 | Musmanno | |
| 4,790,475 A | 12/1988 | Griffin | |
| 4,806,780 A | 2/1989 | Yamamoto | |
| 4,837,693 A | 6/1989 | Schotz | |
| 4,890,228 A | 12/1989 | Longfield | |
| 4,927,071 A | 5/1990 | Wood | |
| 4,934,587 A | 6/1990 | McNabb | |
| 4,960,981 A | 10/1990 | Benton | |
| 4,975,735 A | 12/1990 | Bright | |
| 5,022,683 A | 6/1991 | Barbour | |
| 5,053,607 A | 10/1991 | Carlson | |
| 5,146,606 A | 9/1992 | Grondalski | |
| 5,157,620 A | 10/1992 | Shaar | |
| 5,159,548 A | 10/1992 | Caslavka | |
| 5,191,525 A | 3/1993 | LeBrun | |
| 5,220,501 A | 6/1993 | Lawlor | |
| 5,227,863 A | 7/1993 | Bilbrey et al. | |
| 5,229,589 A | 7/1993 | Schneider | |
| 5,237,159 A | 8/1993 | Stephens | |
| 5,257,320 A | 10/1993 | Etherington et al. | |
| 5,265,008 A | 11/1993 | Benton | |
| 5,321,816 A | 6/1994 | Rogan | |
| 5,347,302 A | 9/1994 | Simonoff | |
| 5,350,906 A | 9/1994 | Brody | |
| 5,373,550 A | 12/1994 | Campbell | |
| 5,419,588 A | 5/1995 | Wood | |
| 5,422,467 A | 6/1995 | Graef | |
| 5,475,403 A | 12/1995 | Havlovick et al. | |
| 5,504,538 A | 4/1996 | Tsujihara | |
| 5,504,677 A | 4/1996 | Pollin | |
| 5,528,387 A | 6/1996 | Kelly et al. | |
| 5,583,759 A | 12/1996 | Geer | |
| 5,590,196 A | 12/1996 | Moreau | |
| 5,594,225 A | 1/1997 | Botvin | |
| 5,598,969 A | 2/1997 | Ong | |
| 5,602,936 A | 2/1997 | Green | |
| 5,610,726 A | 3/1997 | Nonoshita | |
| 5,611,028 A | 3/1997 | Shibasaki | |
| 5,630,073 A | 5/1997 | Nolan | |
| 5,631,984 A | 5/1997 | Graf et al. | |
| 5,668,897 A | 9/1997 | Stolfo | |
| 5,673,320 A | 9/1997 | Ray | |
| 5,677,955 A | 10/1997 | Doggett | |
| 5,678,046 A | 10/1997 | Cahill et al. | |
| 5,679,938 A | 10/1997 | Templeton | |
| 5,680,611 A | 10/1997 | Rail | |
| 5,691,524 A | 11/1997 | Josephson | |
| 5,699,452 A | 12/1997 | Vaidyanathan | |
| 5,734,747 A | 3/1998 | Vaidyanathan | |
| 5,737,440 A | 4/1998 | Kunkler | |
| 5,748,780 A | 5/1998 | Stolfo | |
| 5,751,842 A | 5/1998 | Riach | |
| 5,784,503 A * | 7/1998 | Bleecker et al. | 382/306 |
| 5,830,609 A | 11/1998 | Warner | |
| 5,832,463 A | 11/1998 | Funk | |
| 5,838,814 A | 11/1998 | Moore | |
| 5,863,075 A | 1/1999 | Rich | |
| 5,870,456 A | 2/1999 | Rogers | |
| 5,870,724 A | 2/1999 | Lawlor | |
| 5,870,725 A | 2/1999 | Bellinger et al. | |
| 5,878,337 A | 3/1999 | Joao | |
| 5,893,101 A | 4/1999 | Balogh et al. | |
| 5,897,625 A | 4/1999 | Gustin | |
| 5,901,253 A | 5/1999 | Tretter | |
| 5,903,878 A | 5/1999 | Talati | |
| 5,903,881 A | 5/1999 | Schrader | |
| 5,910,988 A | 6/1999 | Ballard | |
| 5,917,931 A | 6/1999 | Kunkler | |
| 5,924,737 A | 7/1999 | Schrupp | |
| 5,926,548 A | 7/1999 | Okamoto | |
| 5,930,778 A | 7/1999 | Geer | |
| 5,937,396 A | 8/1999 | Konya | |
| 5,940,844 A | 8/1999 | Cahill | |
| 5,982,918 A | 11/1999 | Mennie | |
| 5,987,439 A | 11/1999 | Gustin et al. | |
| 6,012,048 A | 1/2000 | Gustin | |
| 6,014,454 A | 1/2000 | Kunkler | |
| 6,021,202 A | 2/2000 | Anderson | |
| 6,021,397 A | 2/2000 | Jones | |
| 6,029,887 A | 2/2000 | Furuhashi | |
| 6,030,000 A | 2/2000 | Diamond | |
| 6,032,137 A | 2/2000 | Ballard | |
| 6,038,553 A | 3/2000 | Hyde | |
| 6,053,405 A | 4/2000 | Irwin, Jr. et al. | |
| 6,073,119 A | 6/2000 | Borenmisza-wahr | |
| 6,085,168 A | 7/2000 | Mori | |
| 6,097,834 A | 8/2000 | Krouse | |
| 6,097,885 A | 8/2000 | Rayner | |
| 6,105,865 A | 8/2000 | Hardesty | |
| 6,145,738 A | 11/2000 | Stinson et al. | |
| 6,151,426 A | 11/2000 | Lee | |
| 6,159,585 A | 12/2000 | Rittenhouse | |
| 6,170,744 B1 | 1/2001 | Lee | |
| 6,188,506 B1 | 2/2001 | Kaiserman | |
| 6,189,785 B1 | 2/2001 | Lowery | |
| 6,192,165 B1 | 2/2001 | Irons | |
| 6,195,694 B1 | 2/2001 | Chen et al. | |
| 6,199,055 B1 | 3/2001 | Kara | |
| 6,236,009 B1 | 5/2001 | Emigh et al. | |
| 6,243,689 B1 | 6/2001 | Norton | |
| 6,278,983 B1 | 8/2001 | Ball | |
| 6,282,826 B1 | 9/2001 | Richards | |
| 6,293,469 B1 | 9/2001 | Masson et al. | |
| 6,304,860 B1 | 10/2001 | Martin | |
| 6,314,452 B1 | 11/2001 | Dekel | |
| 6,317,727 B1 | 11/2001 | May | |
| 6,328,207 B1 | 12/2001 | Gregoire et al. | |
| 6,330,546 B1 | 12/2001 | Gopinathan et al. | |
| 6,339,658 B1 | 1/2002 | Moccagatta | |
| 6,363,164 B1 | 3/2002 | Jones et al. | |
| 6,390,362 B1 | 5/2002 | Martin | |
| 6,397,196 B1 | 5/2002 | Kravetz | |
| 6,408,084 B1 | 6/2002 | Foley | |
| 6,411,725 B1 | 6/2002 | Rhoads | |
| 6,411,737 B2 | 6/2002 | Wesolkowski et al. | |
| 6,411,938 B1 | 6/2002 | Gates et al. | |
| 6,413,305 B1 | 7/2002 | Mehta | |
| 6,417,869 B1 | 7/2002 | Do | |
| 6,425,017 B1 | 7/2002 | Dievendorff | |
| 6,429,952 B1 | 8/2002 | Olbricht | |
| 6,439,454 B1 | 8/2002 | Masson et al. | |
| 6,449,397 B1 | 9/2002 | Che-Chu | |
| 6,450,403 B1 * | 9/2002 | Martens et al. | 235/379 |
| 6,464,134 B1 | 10/2002 | Page | |
| 6,470,325 B1 | 10/2002 | Leemhuis | |
| 6,505,178 B1 | 1/2003 | Flenley | |
| 6,546,119 B2 | 4/2003 | Ciolli et al. | |
| 6,574,609 B1 | 6/2003 | Downs | |
| 6,578,760 B1 | 6/2003 | Otto | |
| 6,587,837 B1 | 7/2003 | Spagna | |
| 6,606,117 B1 | 8/2003 | Windle | |
| 6,609,200 B2 | 8/2003 | Anderson | |
| 6,611,598 B1 | 8/2003 | Hayosh | |
| 6,614,930 B1 | 9/2003 | Agnihotri et al. | |
| 6,643,416 B1 | 11/2003 | Daniels | |
| 6,654,487 B1 | 11/2003 | Downs, Jr. | |
| 6,661,910 B2 | 12/2003 | Jones et al. | |
| 6,672,452 B1 | 1/2004 | Alves | |
| 6,682,452 B2 | 1/2004 | Quintus | |
| 6,695,204 B1 | 2/2004 | Stinson | |
| 6,711,474 B1 | 3/2004 | Treyz et al. | |
| 6,726,097 B2 | 4/2004 | Graef | |
| 6,728,397 B2 | 4/2004 | Mcneal | |
| 6,738,496 B1 | 5/2004 | Van Hall | |
| 6,742,128 B1 | 5/2004 | Joiner | |
| 6,745,186 B1 | 6/2004 | Testa et al. | |
| 6,755,340 B1 | 6/2004 | Voss | |
| 6,763,226 B1 | 7/2004 | McZeal | |
| 6,781,962 B1 | 8/2004 | Williams | |
| 6,786,398 B1 | 9/2004 | Stinson | |
| 6,789,054 B1 | 9/2004 | Makhlouf | |
| 6,796,491 B2 | 9/2004 | Nakajima | |

| Patent No. | Date | Inventor |
|---|---|---|
| 6,806,903 B1 | 10/2004 | Okisu et al. |
| 6,813,733 B1 | 11/2004 | Li |
| 6,829,704 B2 | 12/2004 | Zhang |
| 6,844,885 B2 | 1/2005 | Anderson |
| 6,856,965 B1 | 2/2005 | Stinson |
| 6,863,214 B2 | 3/2005 | Garner et al. |
| 6,870,947 B2 | 3/2005 | Kelland |
| 6,883,140 B1 | 4/2005 | Acker |
| 6,898,314 B2 | 5/2005 | Kung et al. |
| 6,902,105 B2 | 6/2005 | Koakutsu |
| 6,913,188 B2 | 7/2005 | Wong |
| 6,931,591 B1 | 8/2005 | Brown |
| 6,934,719 B2 | 8/2005 | Nally |
| 6,957,770 B1 | 10/2005 | Robinson |
| 6,961,689 B1 | 11/2005 | Greenberg |
| 6,970,843 B1 | 11/2005 | Forte |
| 6,973,589 B2 | 12/2005 | Wright |
| 6,983,886 B2 | 1/2006 | Natsukari et al. |
| 6,993,507 B2 | 1/2006 | Meyer |
| 6,996,263 B2 | 2/2006 | Jones et al. |
| 6,999,943 B1 | 2/2006 | Johnson |
| 7,003,040 B2 | 2/2006 | Yi |
| 7,004,382 B2 | 2/2006 | Sandru |
| 7,010,155 B2 | 3/2006 | Koakutsu et al. |
| 7,010,507 B1 | 3/2006 | Anderson |
| 7,016,704 B2 | 3/2006 | Pallakoff |
| 7,039,048 B1 | 5/2006 | Monta |
| 7,058,036 B1 | 6/2006 | Yu |
| 7,062,099 B2 | 6/2006 | Li et al. |
| 7,062,456 B1 | 6/2006 | Riehl et al. |
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 | 2/2007 | Buchanan |
| 7,184,980 B2 | 2/2007 | Allen-Rouman et al. |
| 7,197,173 B2 | 3/2007 | Jones et al. |
| 7,200,255 B2 | 4/2007 | Jones |
| 7,204,412 B2 | 4/2007 | Foss, Jr. |
| 7,216,106 B1 | 5/2007 | Buchanan |
| 7,219,082 B2 | 5/2007 | Forte |
| 7,219,831 B2 | 5/2007 | Murata |
| 7,249,076 B1 | 7/2007 | Pendleton |
| 7,252,224 B2 | 8/2007 | Verma |
| 7,266,230 B2 | 9/2007 | Doran |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 | 2/2008 | Wu et al. |
| 7,336,813 B2 | 2/2008 | Prakash et al. |
| 7,343,320 B1 | 3/2008 | Treyz |
| 7,349,566 B2 | 3/2008 | Jones et al. |
| 7,356,505 B2 | 4/2008 | March |
| 7,377,425 B1 | 5/2008 | Ma |
| 7,379,978 B2 | 5/2008 | Anderson |
| 7,385,631 B2 | 6/2008 | Maeno |
| 7,386,511 B2 | 6/2008 | Buchanan et al. |
| 7,391,897 B2 | 6/2008 | Jones |
| 7,391,934 B2 | 6/2008 | Goodall et al. |
| 7,392,935 B2 | 7/2008 | Byrne |
| 7,401,048 B2 | 7/2008 | Rosedale |
| 7,403,917 B1 | 7/2008 | Larsen |
| 7,406,198 B2 | 7/2008 | Aoki et al. |
| 7,421,107 B2 | 9/2008 | Lugg |
| 7,421,410 B1 | 9/2008 | Schechtman et al. |
| 7,433,098 B2 | 10/2008 | Klein et al. |
| 7,437,327 B2 | 10/2008 | Lam |
| 7,440,924 B2 | 10/2008 | Buchanan |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,461,779 B2 | 12/2008 | Ramachandran |
| 7,461,780 B2 | 12/2008 | Potts |
| 7,471,818 B1 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Satou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve et al. |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson et al. |
| 7,566,002 B2 | 7/2009 | Love et al. |
| 7,571,848 B2 | 8/2009 | Cohen |
| 7,587,066 B2 | 9/2009 | Cordery et al. |
| 7,587,363 B2 | 9/2009 | Cataline |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,619,721 B2 | 11/2009 | Jones |
| 7,620,231 B2 | 11/2009 | Jones |
| 7,620,604 B1 | 11/2009 | Bueche, Jr. |
| 7,644,043 B2 * | 1/2010 | Minowa ...................... 705/45 |
| 7,647,275 B2 | 1/2010 | Jones |
| 7,668,363 B2 | 2/2010 | Price |
| 7,672,940 B2 | 3/2010 | Viola |
| 7,676,409 B1 | 3/2010 | Ahmad |
| 7,680,735 B1 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder et al. |
| 7,734,545 B1 | 6/2010 | Fogliano |
| 7,743,979 B2 | 6/2010 | Fredman |
| 7,753,268 B1 | 7/2010 | Robinson et al. |
| 7,766,244 B1 | 8/2010 | Field |
| 7,769,650 B2 | 8/2010 | Bleunven |
| 7,792,752 B1 | 9/2010 | Kay |
| 7,792,753 B1 | 9/2010 | Slater et al. |
| 7,810,714 B2 | 10/2010 | Murata |
| 7,818,245 B2 | 10/2010 | Prakash et al. |
| 7,856,402 B1 | 12/2010 | Kay |
| 7,873,200 B1 | 1/2011 | Oakes, III et al. |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,896,232 B1 | 3/2011 | Prasad et al. |
| 7,900,822 B1 | 3/2011 | Prasad et al. |
| 7,912,785 B1 | 3/2011 | Kay |
| 7,949,587 B1 | 5/2011 | Morris et al. |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,996,314 B1 | 8/2011 | Smith et al. |

| Patent/Publication No. | Date | Name |
|---|---|---|
| 7,996,315 B1 | 8/2011 | Smith et al. |
| 7,996,316 B1 | 8/2011 | Smith et al. |
| 8,001,051 B1 | 8/2011 | Smith et al. |
| 8,046,301 B1 | 10/2011 | Smith et al. |
| 2001/0014881 A1 | 8/2001 | Drummond |
| 2001/0018739 A1 | 8/2001 | Anderson |
| 2001/0027994 A1 | 10/2001 | Hayashida |
| 2001/0042171 A1 | 11/2001 | Vermeulen |
| 2001/0042785 A1 | 11/2001 | Walker |
| 2001/0043748 A1 | 11/2001 | Wesolkowski et al. |
| 2001/0047330 A1 | 11/2001 | Gephart |
| 2001/0054020 A1 | 12/2001 | Barth et al. |
| 2002/0001393 A1 | 1/2002 | Jones |
| 2002/0016763 A1 | 2/2002 | March |
| 2002/0016769 A1 | 2/2002 | Barbara et al. |
| 2002/0032656 A1 | 3/2002 | Chen |
| 2002/0038289 A1 | 3/2002 | Lawlor et al. |
| 2002/0052841 A1 | 5/2002 | Guthrie |
| 2002/0052853 A1 | 5/2002 | Munoz |
| 2002/0065786 A1 | 5/2002 | Martens et al. |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0129249 A1 | 9/2002 | Maillard et al. |
| 2002/0133409 A1 | 9/2002 | Sawano et al. |
| 2002/0138522 A1 | 9/2002 | Muralidhar |
| 2002/0147798 A1 | 10/2002 | Huang |
| 2002/0150279 A1 | 10/2002 | Scott |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta |
| 2002/0171820 A1 | 11/2002 | Okamura |
| 2002/0178112 A1 | 11/2002 | Goeller |
| 2002/0188564 A1 | 12/2002 | Star |
| 2002/0195485 A1 | 12/2002 | Pomerleau et al. |
| 2003/0005326 A1 | 1/2003 | Flemming |
| 2003/0023557 A1 | 1/2003 | Moore |
| 2003/0038227 A1 | 2/2003 | Sesek |
| 2003/0055756 A1 | 3/2003 | Allan |
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0081824 A1 | 5/2003 | Mennie |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown et al. |
| 2003/0105714 A1 | 6/2003 | Alarcon-Luther et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0212904 A1 | 11/2003 | Randle et al. |
| 2003/0217005 A1 | 11/2003 | Drummond et al. |
| 2003/0225705 A1 | 12/2003 | Park et al. |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | De Souza |
| 2004/0013284 A1 | 1/2004 | Yu |
| 2004/0024626 A1 | 2/2004 | Bruijning |
| 2004/0024708 A1 | 2/2004 | Masuda |
| 2004/0030741 A1 | 2/2004 | Wolton et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0117302 A1 | 6/2004 | Weichert |
| 2004/0122754 A1 | 6/2004 | Stevens |
| 2004/0133511 A1 | 7/2004 | Smith et al. |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0210515 A1 | 10/2004 | Hughes |
| 2004/0210523 A1 | 10/2004 | Gains et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0021466 A1 | 1/2005 | Buchanan et al. |
| 2005/0033645 A1 | 2/2005 | Duphily |
| 2005/0033685 A1 | 2/2005 | Reyes |
| 2005/0033695 A1 | 2/2005 | Minowa |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0091161 A1 | 4/2005 | Gustin |
| 2005/0096992 A1 | 5/2005 | Geisel |
| 2005/0097046 A1 | 5/2005 | Singfield |
| 2005/0108164 A1 | 5/2005 | Salafia |
| 2005/0108168 A1 | 5/2005 | Halpin |
| 2005/0115110 A1 | 6/2005 | Dinkins |
| 2005/0127160 A1 | 6/2005 | Fujikawa |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177499 A1 | 8/2005 | Thomas |
| 2005/0177518 A1 | 8/2005 | Brown |
| 2005/0182710 A1 | 8/2005 | Andersson et al. |
| 2005/0188306 A1 | 8/2005 | Mackenzie |
| 2005/0205661 A1 | 9/2005 | Taylor |
| 2005/0209961 A1 | 9/2005 | Michelsen |
| 2005/0228733 A1 | 10/2005 | Bent et al. |
| 2005/0252955 A1 | 11/2005 | Sugai |
| 2005/0267843 A1 | 12/2005 | Acharya |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0278250 A1 | 12/2005 | Zair |
| 2005/0281448 A1 | 12/2005 | Lugg |
| 2005/0281471 A1 | 12/2005 | LeConte |
| 2005/0281474 A1 | 12/2005 | Huang |
| 2005/0289030 A1 | 12/2005 | Smith |

| | | | | | | |
|---|---|---|---|---|---|---|
| 2005/0289182 A1 | 12/2005 | Pandian et al. | | 2007/0156438 A1 | 7/2007 | Popadic et al. |
| 2006/0002426 A1 | 1/2006 | Madour | | 2007/0168265 A1 | 7/2007 | Rosenberger |
| 2006/0004660 A1 | 1/2006 | Pranger | | 2007/0171288 A1 | 7/2007 | Inoue |
| 2006/0025697 A1 | 2/2006 | Kurzweil | | 2007/0172107 A1 | 7/2007 | Jones et al. |
| 2006/0039628 A1 | 2/2006 | Li et al. | | 2007/0172148 A1 | 7/2007 | Hawley |
| 2006/0039629 A1 | 2/2006 | Li | | 2007/0179883 A1 | 8/2007 | Questembert |
| 2006/0041506 A1 | 2/2006 | Mason et al. | | 2007/0183000 A1 | 8/2007 | Eisen et al. |
| 2006/0045321 A1 | 3/2006 | Yu | | 2007/0194102 A1 | 8/2007 | Cohen |
| 2006/0047593 A1 | 3/2006 | Naratil | | 2007/0198432 A1 | 8/2007 | Pitroda et al. |
| 2006/0053056 A1 | 3/2006 | Alspach-Goss | | 2007/0203708 A1 | 8/2007 | Polycn et al. |
| 2006/0059085 A1 | 3/2006 | Tucker | | 2007/0208816 A1 | 9/2007 | Baldwin et al. |
| 2006/0064368 A1 | 3/2006 | Forte | | 2007/0235518 A1 | 10/2007 | Mueller et al. |
| 2006/0080245 A1 | 4/2006 | Bahl | | 2007/0235520 A1 | 10/2007 | Smith et al. |
| 2006/0085357 A1 | 4/2006 | Pizarro | | 2007/0241179 A1 | 10/2007 | Davis |
| 2006/0102704 A1 | 5/2006 | Reynders | | 2007/0244782 A1 | 10/2007 | Chimento |
| 2006/0106691 A1 | 5/2006 | Sheaffer | | 2007/0246525 A1 | 10/2007 | Smith et al. |
| 2006/0106717 A1 | 5/2006 | Randle | | 2007/0251992 A1 | 11/2007 | Sharma et al. |
| 2006/0110063 A1 | 5/2006 | Weiss | | 2007/0255652 A1 | 11/2007 | Tumminaro |
| 2006/0112013 A1 | 5/2006 | Maloney | | 2007/0255653 A1 | 11/2007 | Tumminaro |
| 2006/0115110 A1 | 6/2006 | Rodriguez | | 2007/0255662 A1 | 11/2007 | Tumminaro |
| 2006/0115141 A1 | 6/2006 | Koakutsu | | 2007/0258634 A1 | 11/2007 | Simonoff |
| 2006/0118613 A1 | 6/2006 | McMann | | 2007/0271182 A1 | 11/2007 | Prakash et al. |
| 2006/0144924 A1 | 7/2006 | Stover | | 2007/0278286 A1 | 12/2007 | Crowell et al. |
| 2006/0144950 A1 | 7/2006 | Johnson | | 2007/0288380 A1 | 12/2007 | Starrs |
| 2006/0161501 A1 | 7/2006 | Waserstein | | 2007/0288382 A1 | 12/2007 | Narayanan et al. |
| 2006/0164682 A1 | 7/2006 | Lev | | 2007/0295803 A1 | 12/2007 | Levine |
| 2006/0167818 A1 | 7/2006 | Wentker et al. | | 2008/0002911 A1 | 1/2008 | Eisen |
| 2006/0182331 A1 | 8/2006 | Gilson et al. | | 2008/0021802 A1 | 1/2008 | Pendelton |
| 2006/0182332 A1 | 8/2006 | Weber | | 2008/0040280 A1 | 2/2008 | Davis et al. |
| 2006/0206506 A1 | 9/2006 | Fitzpatrick | | 2008/0052182 A1 | 2/2008 | Marshall |
| 2006/0210138 A1 | 9/2006 | Hilton et al. | | 2008/0059376 A1 | 3/2008 | Davis |
| 2006/0214940 A1 | 9/2006 | Kinoshita | | 2008/0063253 A1 | 3/2008 | Wood |
| 2006/0215204 A1 | 9/2006 | Miyamoto et al. | | 2008/0068674 A1 | 3/2008 | McIntyre |
| 2006/0215230 A1 | 9/2006 | Borrey et al. | | 2008/0071721 A1 | 3/2008 | Wang |
| 2006/0222260 A1 | 10/2006 | Sambongi et al. | | 2008/0080760 A1 | 4/2008 | Ronca |
| 2006/0229976 A1 | 10/2006 | Jung | | 2008/0086420 A1 | 4/2008 | Gilder et al. |
| 2006/0229986 A1 | 10/2006 | Corder | | 2008/0086421 A1 | 4/2008 | Gilder |
| 2006/0238503 A1 | 10/2006 | Smith | | 2008/0091599 A1 | 4/2008 | Foss, Jr. |
| 2006/0242062 A1 | 10/2006 | Peterson | | 2008/0097899 A1 | 4/2008 | Jackson et al. |
| 2006/0242063 A1 | 10/2006 | Peterson | | 2008/0103790 A1 | 5/2008 | Abernethy |
| 2006/0249567 A1 | 11/2006 | Byrne | | 2008/0103967 A1 | 5/2008 | Ackert et al. |
| 2006/0274164 A1 | 12/2006 | Kimura et al. | | 2008/0113674 A1 | 5/2008 | Baig |
| 2006/0279628 A1 | 12/2006 | Fleming | | 2008/0114739 A1 | 5/2008 | Hayes |
| 2006/0282383 A1 | 12/2006 | Doran | | 2008/0117991 A1 | 5/2008 | Peddireddy |
| 2006/0291744 A1 | 12/2006 | Ikeda et al. | | 2008/0119178 A1 | 5/2008 | Peddireddy |
| 2007/0016796 A1 | 1/2007 | Singhal | | 2008/0133411 A1 | 6/2008 | Jones et al. |
| 2007/0019243 A1 | 1/2007 | Sato | | 2008/0147549 A1 | 6/2008 | Ruthbun |
| 2007/0022053 A1 | 1/2007 | Waserstein | | 2008/0156438 A1 | 7/2008 | Stumphauzer |
| 2007/0027802 A1 | 2/2007 | VanDeburg et al. | | 2008/0162350 A1 | 7/2008 | Allen-Rouman et al. |
| 2007/0031022 A1 | 2/2007 | Frew | | 2008/0162371 A1 | 7/2008 | Rampell et al. |
| 2007/0038561 A1 | 2/2007 | Vancini et al. | | 2008/0177659 A1 | 7/2008 | Lacey et al. |
| 2007/0041629 A1 | 2/2007 | Prakash et al. | | 2008/0180750 A1 | 7/2008 | Feldman |
| 2007/0050292 A1 | 3/2007 | Yarbrough | | 2008/0208727 A1 | 8/2008 | McLaughlin et al. |
| 2007/0053574 A1 | 3/2007 | Verma et al. | | 2008/0214180 A1 | 9/2008 | Cunningham et al. |
| 2007/0058851 A1 | 3/2007 | Quine | | 2008/0219543 A1 | 9/2008 | Csulits |
| 2007/0063016 A1 | 3/2007 | Myatt | | 2008/0245869 A1 | 10/2008 | Berkun et al. |
| 2007/0064991 A1 | 3/2007 | Douglas et al. | | 2008/0247629 A1 | 10/2008 | Gilder |
| 2007/0065143 A1 | 3/2007 | Didow et al. | | 2008/0247655 A1 | 10/2008 | Yano |
| 2007/0075772 A1 | 4/2007 | Kokubo | | 2008/0249931 A1 | 10/2008 | Gilder |
| 2007/0076940 A1 | 4/2007 | Goodall et al. | | 2008/0249951 A1 | 10/2008 | Gilder et al. |
| 2007/0076941 A1 | 4/2007 | Carreon et al. | | 2008/0262953 A1 | 10/2008 | Anderson |
| 2007/0077921 A1 | 4/2007 | Hayashi | | 2008/0275821 A1 | 11/2008 | Bishop et al. |
| 2007/0080207 A1 | 4/2007 | Williams | | 2008/0316542 A1 | 12/2008 | Mindrum et al. |
| 2007/0082700 A1 | 4/2007 | Landschaft | | 2009/0024520 A1 | 1/2009 | Drory et al. |
| 2007/0084911 A1 | 4/2007 | Crowell | | 2009/0046938 A1 | 2/2009 | Yoder |
| 2007/0086642 A1 | 4/2007 | Foth | | 2009/0060396 A1 | 3/2009 | Blessan et al. |
| 2007/0086643 A1 | 4/2007 | Spier | | 2009/0108080 A1 | 4/2009 | Meyer |
| 2007/0094088 A1 | 4/2007 | Mastie | | 2009/0110281 A1 | 4/2009 | Hirabayashi |
| 2007/0100748 A1 | 5/2007 | Dheer | | 2009/0141962 A1 | 6/2009 | Borgia |
| 2007/0110277 A1 | 5/2007 | Hayduchok et al. | | 2009/0171819 A1 | 7/2009 | Emde et al. |
| 2007/0118472 A1 | 5/2007 | Allen-Rouman et al. | | 2009/0171825 A1 | 7/2009 | Roman |
| 2007/0122024 A1 | 5/2007 | Haas et al. | | 2009/0173781 A1 | 7/2009 | Ramachandran |
| 2007/0127805 A1 | 6/2007 | Foth et al. | | 2009/0190823 A1 | 7/2009 | Walters |
| 2007/0129955 A1 | 6/2007 | Dalmia | | 2009/0192938 A1 | 7/2009 | Amos |
| 2007/0136198 A1 | 6/2007 | Foth et al. | | 2009/0236413 A1 | 9/2009 | Mueller et al. |
| 2007/0140545 A1 | 6/2007 | Rossignoli | | 2009/0252437 A1 | 10/2009 | Li |
| 2007/0140594 A1 | 6/2007 | Franklin | | 2009/0281904 A1 | 11/2009 | Pharris |
| 2007/0143208 A1 | 6/2007 | Varga | | 2009/0313167 A1 | 12/2009 | Dujari |
| 2007/0150337 A1 | 6/2007 | Hawkins et al. | | 2010/0007899 A1 | 1/2010 | Lay |

| | | | |
|---|---|---|---|
| 2010/0027679 | A1 | 2/2010 | Sunahara et al. |
| 2010/0047000 | A1 | 2/2010 | Park et al. |
| 2010/0057578 | A1 | 3/2010 | Blair et al. |
| 2010/0061446 | A1 | 3/2010 | Hands et al. |
| 2010/0082470 | A1 | 4/2010 | Walach |
| 2010/0165015 | A1 | 7/2010 | Barkley et al. |
| 2010/0260408 | A1 | 10/2010 | Prakash et al. |
| 2010/0262522 | A1 | 10/2010 | Anderson et al. |
| 2010/0312705 | A1 | 12/2010 | Caruso et al. |
| 2011/0112967 | A1 | 5/2011 | Anderson et al. |

OTHER PUBLICATIONS

Electronic Billing Problem: The E-check is in the mail-American Banker-v 168n.5,91, May 19, 2003.
U.S. Appl. No. 11/320,998, filed Dec. 29, 2005, Luby et al.
U.S. Appl. No. 11/321,025, filed Dec. 29, 2005, Luby et al.
U.S. Appl. No. 11/321,027, filed Dec. 29, 2005, Luby et al.
U.S. Appl. No. 11/591,131, filed Oct. 31, 2006, Luby et al.
U.S. Appl. No. 11/591,014, filed Oct. 31, 2006, Oaks et al.
U.S. Appl. No. 11/590,971, filed Oct. 31, 2006, Oaks et al.
U.S. Appl. No. 11/591,247, filed Oct. 31, 2006, Oaks et al.
U.S. Appl. No. 11/590,963, filed Oct. 31, 2006, Oaks et al.
U.S. Appl. No. 11/591,025, filed Oct. 31, 2006, Oaks et al.
U.S. Appl. No. 11/591,003, filed Oct. 31, 2006, Oaks et al.
U.S. Appl. No. 11/591,974, filed Oct. 31, 2006, Oaks et al.
U.S. Appl. No. 11/591,273, filed Oct. 31, 2006, Walls et al.
U.S. Appl. No. 11/591,262, filed Oct. 31, 2006, Walls et al.
U.S. Appl. No. 11/591,227, filed Oct. 31, 2006, Walls et al.
U.S. Appl. No. 11/591,261, filed Oct. 31, 2006, Walls et al.
U.S. Appl. No. 11/590,998, filed Oct. 31, 2006, Walls et al.
U.S. Appl. No. 11/591,228, filed Oct. 31, 2006, Walls et al.
U.S. Appl. No. 11/591,320, filed Oct. 31, 2006, Walls et al.
"Accept "Customer Not Present" Checks," Accept Check Online, http://checksoftware.com, patent No. 7,900,822, as dated 2007 (1 pg).
"Adjusting Brightness and Contrast", www.eaglesoftware.com/adjustin.htm, retrieved on May 4, 2009 (4 pages).
Affinity Federal Credit Union, "Affinity Announces Online Deposit," Aug. 4, 2005 (1 pg).
Albrecht, W. Steve, "Check Kiting: Detection, Prosecution and Prevention," The FBI Law Enforcement Bulletin, Nov. 1, 1993. (6 pgs).
Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).
Anderson, Milton M. "FSML and Echeck", Financial Services Technology Consortium, 1999 (17 pgs).
Archive Index Systems; Panini My Vision X-30 or VX30 or X30 © 1994-2008 Archive Systems, Inc. P./O. Box 40135 Bellevue, WA USA 98015 (2 pgs).
Associate of German Banks, SEPA 2008: Uniform Payment Instruments for Europe, Berlin, patent No. 7,900,822, as dated Jul. 2007, Bundesverbankd deutscher banker ev (42 pgs).
Bank Systems & Technology, Untitled Article, May 1, 2006, http://www.banktech.com/showarticle.jhtml? articleID=187003126, "Are you Winning in the Payment World?" (4 pgs).
BankServ, "DepositNow: What's the difference?" patent No. 7,970,677, as dated 2006, (4 pgs).
BankServ, Product Overview, http://www.bankserv.com/products/remotedeposit.htm, patent No. 7,970,677, as dated 2006, (3 pgs).
Blafore, Bonnie "Lower Commissions, Fewer Amenities", Better Investing, Madison Heights: Feb. 2003, vol. 52, Iss 6, (4 pgs).
Blue Mountain Consulting, from URL: www.bluemontainconsulting.com, patent No. 7,900,822, as dated Apr. 26, 2006 (3 pgs).
Board of Governors of the federal reserve system, "Report to the Congress on the Check Clearing for the 21$^{st}$ Century Act of 2003" Apr. 2007, Submitted to Congress pursuant to section 16 of the Check Clearing for the 21$^{st}$ Century Act of 2003, (59 pgs).
Bruene, Jim; "Check Free to Enable In-Home Remote Check Deposit for Consumers and Small Business", NetBanker.Com, FinancialInsite, Inc., http://www.netbanker.com/2008/02/checkfree_to_enablejnhome_rem.html, Feb. 5, 2008 (3 pages).

Bruene, Jim; "Digital Federal Credit Union and Four Others Offer Consumer Remote Deposit Capture Through EasCorp", NetBanker-Tracking Online Finance, www.netbanker.com/2008/04/diqital federal credit union a.html, Apr. 13, 2008 (3 pages).
Burnett, J. "Depository Bank Endorsement Requirements," BankersOnline.com, http://vvww.bankersonline.com/cgi-bin/printview/printview.pl, Jan. 6, 2003 (3 pgs).
Canon, ImageFormula CR-25/CR-55, "Improve Your Bottom Line with Front-Line Efficiencies", 0117W117, 1207-55/25-1 OM-BSP, U.S. Pat. No. 7,949,587 as dated 2007. (4 pgs).
"Chapter 7 Payroll Programs," Uniform Staff Payroll System, http://www2.oecn.k12.oh.us/www/ssdt/usps/usps_user_guide_005.html, patent No. 7,900,822, as dated 2007 (9 pgs).
"Check 21—The check is not in the post", RedTitan Technology 2004 http://www.redtitan.com/check21/htm (3 pgs).
"Check 21 Solutions," Columbia Financial International, Inc. http://www.columbiafinancial.us/check21/solutions.htm, patent No. 7,900,822, as dated 2007 (8 pgs).
"Check Fraud: A Guide to Avoiding Losses", All Net, http://all.net/books/audit/checkfraud/security.htm, patent No. 7,900,822, as dated 2007 (1 pg).
Chiang, Chuck, The Bulletin, "Remote banking offered", http://bendbulletin.com/apps/pbcs.dll/article?AID=/20060201/BIZ0102/602010327&templ . . . (2pgs), 2006.
CNN.com/technology, "Scan, deposit checks from home", www.cnn.com/2008ITECH/biztech/02/07/check.scanning.ap/index.html, Feb. 7, 2008 (3 pgs).
"Compliance with Regulation CC", http./www/federalreserve.gov/Pubs/regcc/regcc.htm, Jan. 24, 2006 (6 pgs).
Constanzo, Chris, "Remote Check Deposit: Wells Captures A New Checking Twist", Bank Technology News Article—May 2005, www.americanbanker.com/btn_article.html?id=20050502YQ50FSYG (2 pgs).
Craig, Ben, "Resisting Electronic Payment Systems: Burning Down the House?", Federal Reserve Bank of Cleveland, Jul. 1999 (4 pgs).
Creativepaymentsolutions.com, "Creative Payment Solutions—Websolution," www.creativepaymentsolution.com/cps/financialservices/websolution/default. html, Copyright 2008, Creative Payment Solutions, Inc. (1 pg).
Credit Union Journal, "The Ramifications of Remote Deposit Capture Success", www.cuiournal.com/orintthis.html?id=20080411EODZT57G, Apr. 14, 2008 (1 page).
Credit Union Journal, "AFCU Averaging 80 DepositHome Transactions Per Day", Credit Union Journal, Aug. 15, 2005 (1 pg).
"Customer Personalized Bank Checks and Address Labels" Checks Your Way Inc., http://www.checksyourway.com/htm/web_pages/faq.htm, patent No. 7,900,822, as dated 2007 (6 pgs).
DCU Members Monthly—Jan. 2008, "PC Deposit—Deposit Checks from Home!", http://www.mycreditunionnewsletter.com/dcu/0108/page1.html, Copyright 2008 Digital Federal Credit Union (2 pgs).
De Queiroz, Ricardo et al., "Mixed Raster Content (MRC) Model for Compound Image Compression", 1998 (14 pgs).
DeYoung, Robert; "The Financial Performance of Pure Play Internet Banks"; Federal Reserve Bank of Chicago Economic Perspectives; 2001; pp. 60-75; vol. 25, No. 1 (16pgs).
Dias, Danilo et al., "A Model for the Electronic Representation of Bank Checks", Brasilia Univ. Oct. 2006 (5 pgs).
Digital Transactions News, "An ACH-Image Proposal for Check Roils Banks and Networks" May 26, 2006 (3 pgs).
Dinan, R.F. et al., "Image Plus High Performance Transaction System", IBM Systems Journal, 1990 vol. 29, No. 3 (14 pgs).
"Direct Deposit Application for Payroll", Purdue University, Business Office Form 0003, http://purdue.edu/payroll/pdf/directdepositapplication.pdf, Jul. 2007 (2 pgs).
"Direct Deposit Authorization Form", www.umass.edu/humres/library/DDForm.pdf, May 2003 (3 pgs).
"Direct Deposit," University of Washington, http://www.washington.edu/admin/payroll/directdeposit.html, patent No. 7,900,822, as dated 2007 (3 pgs).

Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html, patent No. 7,873,200, as dated Dec. 2005 (20 pgs).

Federal Reserve Board, "Check Clearing for the 21st Century Act", FRB, http://www.federalreserve.gov/paymentsystems/truncation/, Mar. 1, 2006 (1 pg).

Fest, Glen., "Patently Unaware" Bank Technology News, Apr. 2006, Retrieved from the Internet at URL:http://banktechnews.com/article.html?id=2006403T7612618 (5 pgs).

Fisher, Dan M., "Home Banking in the 21st Century: Remote Capture Has Gone Retail", May 2008 (4 pages).

"Frequently Asked Questions" Bank of America, http://www/bankofamerica.com/deposits/checksave/index.cfm?template-lc_faq_bymail, patent No. 7,900,822, as dated 2007 (2 pgs).

"Full Service Direct Deposit", www.nonprofitstaffing.com/images/upload/dirdepform.pdf. patent No. 7,900,822, as dated 2001, (2 pgs).

Furst, Karen et al., "Internet Banking: Developments and Prospects", Economic and Policy Analysis Working Paper 2000-9, Sep. 2000 (60 pgs).

German Shegalov, Diplom-Informatiker, "Integrated Data, Message, and Process Recovery for Failure Masking in Web Services", Dissertation Jul. 2005 (146 pgs).

Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).

Hartly, Thomas, "Banks Check Out New Image", Business First, Buffalo: Jul. 19, 2004, vol. 20, Issue 43, (3 pgs).

Heckenberg, D. "Using Mac OS X for Real-Time Image Processing" Oct. 8, 2003 (15 pgs).

"How to Digitally Deposit a Check Image", Smart Money Daily, Copyright 2008 (5 pgs).

Image Master, "Photo Restoration: We specialize in digital photo restoration and photograph repair of family pictures", http://www.imphotorepair.com, patent No. 7,900,822, as downloaded Apr. 2007 (1 pg).

"It's the easiest way to Switch banks", LNB, http://www.inbky.com/pdf/LNBswitch-kit10-07.pdf patent No. 7,996,316, as dated 2007 (7 pgs).

Johnson, Jennifer J., Secretary of the Board; Federal Reserve System, 12 CFR Part 229, Regulation CC, "Availability of Funds and Collection of Checks". Patent No. 7,900,822, as dated 2009, (89 pgs).

Kendrick, Kevin B., "Check Kidting, Float for Purposes of Profit," Bank Security & Fraud Prevention, vol. 1, No. 2, 1994. (3 pgs).

Kiser, Elizabeth K.; "Modeling the Whole Firm: The Effect of Multiple Inputs and Financial Intermediation on Bank Deposit Rates;" Feds Working Paper No. 2004-07; Jun. 3, 2003; pp. 1-46 (46 pgs).

Knestout, Brian P. et al., "Banking Made Easy" Kiplinger's Personal Finance Washington, Jul. 2003, vol. 57, Iss 7 (5 pgs).

Kornai Andras et al., "Recognition of Cursive Writing on Personal Checks", Proceedings of International Workshop on the Frontiers in Handwritting Recognition, patent No. 7,900,822, as dated Sep. 1996, (6 pgs).

"Lesson 38 —More Bank Transactions", Turtle Soft, http://www.turtlesoft.com/goldenseal-software-manual.lesson38.htm, patent No. 7,900,822, as dated 2007 (8 pgs).

Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).

"Middleware", David E. Bakken, Encyclopedia of Distributed Computing, Kluwer Academic Press, 2001 (6 pgs).

Mitek systems, "Imagenet Mobile Deposit", San Diego, CA, downloaded 2009 (2 pgs).

Mitek Systems: Mitek Systems Launches First Mobile Check Deposit and Bill Pay Application, San Diego, CA, Jan. 22, 2008 (3 pgs).

Mohl, Bruce, "Banks Reimbursing ATM Fee to Compete With Larger Rivals", Boston Globe, Boston, MA, Sep. 19, 2004 (3 pgs).

Online Deposit: Frequently Asked Questions, http://www.depositnow.com/faq.html, Copyright 2008 (1 pg).

Onlinecheck.com/Merchant Advisors, "Real-Time Check Debit", Merchant Advisors: Retail Check Processing Check Conversion, http://www.onlinecheck/wach/rcareal.htm, patent No. 7,900,822, as dated 2006 (3 pgs).

Oxley, Michael G. from committee on Financial Services; "Check Clearing for the $21^{st}$ Century Act", $108^{th}$ Congress, $1^{st}$ Session House of Representatives report 108-132, Jun. 2003 (20 pgs).

Oxley, Michael G., from the committee of conference; "Check Clearing for the $21^{st}$ Century Act" $108^{th}$ Congress, $1^{st}$ Session Senate report 108-291, Oct. 1, 2003 (27 pgs).

Palacios, Rafael et al., "Automatic Processing of Brazilian Bank Checks". Patent No. 7,900,822, as dated 2002 (28 pgs).

Patterson, Scott "USAA Deposit@Home—Another WOW moment for Net Banking", NextCU.com, Jan. 26, 2007 (5 pgs).

"Personal Finance", PNC, http://www.pnc.com/webapp/unsec/productsandservice.do?sitearea=/PNC/home/personal/account+services/quick+switch/quick+switch+faqs, patent No. 7,900,822, as dated 2007 (12 pgs).

Public Law 108-100, 108 Congress; "An Act Check Clearing for the $21^{st}$ Century Act", Oct. 28, 2003, 117 STAT. 1177 (18 pgs).

Rao, Bharat; "The Internet and the Revolution in Distribution: A Cross-Industry Examination"; Technology in Society; 1999; pp. 287-306; vol. 21, No. 3 (20 pgs).

"Refractive index" Wikipedia, the free encyclopedia; http://en.wikipedia.org./wiki/refractiveindex.com Oct. 16, 2007 (4 pgs).

"Remote Deposit Capture", Plante & Moran, http://plantemoran.com/industries/fincial/institutions/bank/resources/community+bank+advisor/2007+summer+issue/remote+deposit+capture.htm, patent No. 7,900,822, as dated 2007 (3 pgs).

"Remote Deposit" National City, http://www.nationalcity.com/smallbusiness/cashmanagement/remotedeposit/default.asp; patent No. 7,900,822, as dated 2007 (1 pg).

Remotedepositcapture, URL:www.remotedepositcapture.com, patent No. 7,900,822, as dated 2006 (5 pgs).

RemoteDepositCapture.com, "PNC Bank to Offer Ease of Online Deposit Service Integrated with QuickBooks to Small Businesses", Remote Deposit Capture News Articles from Jul. 24, 2006, (2 pgs).

RemoteDepositCapture.com, Remote Deposit Capture News Articles from Jul. 6, 2006, "BankServ Announces New Remote Deposit Product Integrated with QuickBooks" (3 pgs).

Remotedepsitcapture.com, LLC, "Remote Deposit Capture Overview," ROC Overview, http://remotedepositcapture.com/overview/RDC_overview.htm, patent No. 7,900,822, as dated Mar. 12, 2007 (4 pgs).

Ritzer, J.R. "Hinky Dinky helped spearhead POS, remote banking movement", Bank Systems and Equipment, vol. 21, No. 12, Dec. 1984 (1 pg).

Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998 (41 pgs).

Rose, Sarah et al., "Best of the We: The Top 50 Financial Websites", Money, New York, Dec. 1999, vol. 28, Iss. 12 (8 pgs).

"Save on ATM Fees", RedEye Edition, Chicago Tribune, Chicago, IL Jun. 30, 2007 (2 pgs).

Shelby, Hon. Richard C. (Committee on Banking, Housing and Urban Affairs); "Check Truncation Act of 2003", calendar No. 168, $108^{th}$ Congress, $1^{st}$ Session Senate report 108-79, Jun. 2003 (27 pgs).

"Switching Made Easy," Bank of North Georgia, http://www.banknorthgeorgia.com/cmsmaster/documents/286/documents616.pdf, 2007 (7 pgs).

The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, patent No. 7,900,822, as dated Dec. 2005 (3 pgs).

The Green Sheet 2.0: Newswire, "CO-OP adds home deposit capabilities to suite of check imaging products", www.greensheet.com/newswire.php?newswire_id=8799, Mar. 5, 2008 (2 pages).

"Two Words Every Business Should Know: Remote Deposit," Canon, http://www.rpsolutions.com/rpweb/pdfs/canon_rdc.pdf, 2005 (7 pgs).

Tygar, J.D., Atomicity in Electronic Commerce, in ACM Networker, 2:2, Apr./May 1998 (12 pgs).

Valentine, Lisa, "Remote Deposit Capture Hot Just Got Hotter," ABA Banking Journal, Mar. 2006, p. 1-9.

"Virtual Bank Checks", Morebusiness.com, http://www.morebusiness.com/running_your business/businessbits/d908484987.brc, Cited in patent No. 7,900,822, as dated 2007 (3 pgs).

Wade, Will, "Early Notes: Updating Consumers on Check 21" American Banker Aug. 10, 2004 (3 pgs).

"WaliStreetGrapevine.com" Stocks on the Rise: JADG, BKYI, MITK; Mar. 3, 2008 (4 pages).

Wallison, Peter J., "Wal-Mart Case Exposes Flaws in Banking-Commerce Split", American Banker, vol. 167. No. 8, Jan. 11, 2002 (3 pgs).

Wells Fargo 2005 News Releases, "The New Wells Fargo Electronic Deposit Services Break Through Banking Boundaries in the Age of Check 21", San Francisco Mar. 28, 2005, www.wellsfargo.com/press/3282005_check21Year=2005 (1 pg).

Wells Fargo Commercial, "Remote Deposit", www.wellsfargo.com/com/treasury mgmtlreceivables/electronic/remote deposit, Copyright 2008 (1 pg).

"What is check Fraud", National Check Fraud Center, http://www.ckfraud.org/ckfraud.html, patent No. 7,900,822, as dated 2007 (12 pgs).

White, J.M. et al., "Image Thresholding for Optical Character Recognition and Other Applications Requiring Character Image Extraction", IBM J. Res. Development, Jul. 1983, vol. 27, No. 4 (12 pgs).

Whitney et al., "Reserve Banks to Adopt DSTU X9.37/2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pages).

Windowsfordevices.com, "Software lets camera phone users deposit checks, pay bills", www.windowsfordevices.com/news/NS3934956670.html, Jan. 29, 2008 (3 pgs).

Woody Baird Associated Press, "Pastor's Wife got Scammed—She Apparently Fell for Overseas Money Scheme," The Commerical Appeal, Jul. 1, 2006, p. A. 1.

Zhang, C.Y., "Robust Estimation and Image Combining" Astronomical Data Analysis Software and Systems IV, ASP Conference Series, 1995 (5 pgs).

Office Action from corresponding U.S. Appl. No. 12/202,515 dated Dec. 30, 2008 (8 pgs).

Notice of Allowance from corresponding U.S. Appl. No. 12/202,515 dated Jul. 6, 2009 (7 pgs).

Office Action from corresponding U.S. Appl. No. 12/202,749 dated Dec. 30, 2008 (8 pgs).

Final Office Action from corresponding U.S. Appl. No. 12/202,749 dated Jul. 17, 2009 (6 pgs).

Notice of Allowance from corresponding U.S. Appl. No. 12/202,749 dated Nov. 30, 2009 (7 pgs).

"Best practices for producing quality digital image files," Digital Images Guidelines, http://deepblue.lib.umich.edu/bitstream/2027.42/40247/1/Images-Best_Practice.pdf, downloaded 2007 (2 pgs).

"ImageNet Mobile Deposit Provides Convenient Check Deposit and Bill Pay to Mobile Consumers," Miteksystems, 2008 (2 pgs).

"Mitek Systems Announces Mobile Deposit Application for Apple iPhone," http://prnewswire.com/cgi-bin/stories/pl?ACCT=104&STORY=/www/story/10-01-. . . , Nov. 25, 2008 (2 pgs).

Automated Merchant Systems, Inc., "Electronic Check Conversion," http://www.automatedmerchant.com/electronic_check_conversion.cfm, 2006, downloaded Oct. 18, 2006 (3 pgs).

BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).

Bruno, M., "Instant Messaging," Bank Technology News, Dec. 2002 (3 pgs).

Carrubba, P. et al., "Remote Deposit Capture: A White Paper Addressing Regulatory, Operational and Risk Issues," NetDeposit Inc., 2006 (11 pgs).

Century Remote Deposit High-Speed Scanner User's Manual Release 2006, (Century Manual), Century Bank, 2006, (32 pgs).

De Jesus, A. et al., "Distributed Check Processing in a Check 21 Environment: An educational overview of the opportunities and challenges associated with implementing distributed check imaging and processing solutions," Panini, 2004, pp. 1-22.

eCU Technologies, "Upost Remote Deposit Solution," Retrieved from the internet https://www.eutechnologies.com/products/upost.html, downloaded 2009 (1 pg).

EFT Network Unveils FAXTellerPlus, EFT Network, Inc., www.eftnetwork.com, Jan. 13, 2009 (2 pgs).

ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).

Federal Reserve System, "12 CFR, Part 229 [Regulation CC]: Availability of Funds and Collection of Checks," Federal Registrar, Apr. 28, 1997, pp. 1-50.

Federal Reserve System, "Part IV, 12 CFR Part 229 [Regulation CC]: Availability of Funds and Collection of Checks; Final Rule," Federal Registrar, vol. 69, No. 149, Aug. 4, 2004, pp. 47290-47328.

Fidelity Information Services, "Strategic Vision Embraces Major Changes in Financial Services Solutions: Fidelity's long-term product strategy ushers in new era of application design and processing," Insight, 2004, pp. 1-14.

Garry, M., "Checking Options: Retailers face an evolving landscape for electronic check processing that will require them to choose among several scenarios," Supermarket News, vol. 53, No. 49, 2005 (3 pgs).

Gupta, Maya R. et al., "OCR binarization and image pre-processing for searching historical documents," Pattern Recognition, vol. 40, No. 2, Feb. 2007, pp. 389-397.

Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).

Hildebrand, C. et al., "Electronic Money," Oracle, http://www.oracle.com/oramag/profit/05-feb/p15financial.html, 2005, downloaded Oct. 18, 2006 (5 pgs).

Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).

Investment Systems Company, "Portfolio Accounting System," 2000, pp. 1-32.

Levitin, Adam J., Remote Deposit Capture: A Legal and Transactional Overview, Banking Law Journal, p. 115, 2009 (RDC).

Metro 1 Credit Union, "Remote Banking Services," hltp://ww\\i.metro1cu.org/metro1cu/remote.html, downloaded Apr. 17, 2007 (4 pgs).

Moreau, T., "Payment by Authenticated Facsimile Transmission: a Check Replacement Technology for Small and Medium Enterprises," CONNOTECH Experts-conseils, Inc., Apr. 1995 (31 pgs).

Nelson, B. et al., "Remote deposit capture changes the retail landscape," Northwestern Financial Review, http://findarticles.com/p/articles/mi qa3799/is200607/ai_n16537250, 2006 (3 pgs).

NetBank, Inc., "Branch Out: Annual Report 2004," 2004 (150 pgs).

NetBank, Inc., "Quick Post: Deposit and Payment Forwarding Service," 2005 (1 pg).

NetDeposit Awarded Two Patents for Electronic Check Process, NetDeposit, Jun. 18, 2007, (1 pg).

Richey, J. C. et al., "EE 4530 Check Imaging," Nov. 18, 2008 (10 pgs).

SoyBank Anywhere, "Consumer Internet Banking Service Agreement," Dec. 6, 2004 (6 pgs).

Teixeira, D., "Comment: Time to Overhaul Deposit Processing Systems," American Banker, Dec. 10, 1998, vol. 163, No. 235, p. 15 (3 pgs).

Thailandguru.com: How and where to Pay Bills @ www.thailandguru.com/paying-bills.html (2 pgs).

Wikipedia ®, "Remote Deposit," http://en.wikipedia.org/wiki/Remote_deposit, 2007 (3 pgs).

Zions Bancorporation, "Moneytech, the technology of money in our world: Remote Deposit," http://www.bankjunior.com/pground/moneytech/remote_deposit.jsp, 2007 (2 pgs).

U.S. Appl. No. 12/062,143, filed Apr. 3, 2008 (27 pgs).
U.S. Appl. No. 12/859,741, filed Aug. 19, 2010 (235 pgs).
U.S. Appl. No. 12/195,723, filed Aug. 19, 2010 (38 pgs).
U.S. Appl. No. 12/545,127, filed Aug. 21, 2009 (45 pgs).
U.S. Appl. No. 12/549,443, filed Aug. 28, 2009 (41 pgs).
U.S. Appl. No. 11/613,656, filed Dec. 20, 2006 (21 pgs).
U.S. Appl. No. 12/982,494, filed Dec. 30, 2010 (280 pgs).
U.S. Appl. No. 12/982,561, filed Dec. 30, 2010 (275 pgs).
U.S. Appl. No. 12/982,578, filed Dec. 30, 2010 (274 pgs).
U.S. Appl. No. 12/982,594, filed Dec. 30, 2010 (275 pgs).
U.S. Appl. No. 12/388,005, filed Feb. 18, 2009 (37 pgs).
U.S. Appl. No. 11/487,537, filed Jul. 13, 2006 (23 pgs).
U.S. Appl. No. 12/509,613, filed Jul. 27, 2009 (48 pgs).
U.S. Appl. No. 12/509,680, filed Jul. 27, 2009 (41 pgs).
U.S. Appl. No. 12/137,051, filed Jun. 11, 2008 (29 pgs).
U.S. Appl. No. 13/155,976, filed Jun. 8, 2011 (352 pgs).
U.S. Appl. No. 13/156,007, filed Jun. 8, 2011 (356 pgs).
U.S. Appl. No. 13/156,018, filed Jun. 8, 2011 (353 pgs).
U.S. Appl. No. 11/686,924, filed Mar. 15, 2007 (34 pgs).
U.S. Appl. No. 11/686,928, filed Mar. 15, 2007 (36 pgs).
U.S. Appl. No. 12/397,671, filed Mar. 4, 2009 (40 pgs).
U.S. Appl. No. 12/397,930, filed Mar. 4, 2009 (37 pgs).
U.S. Appl. No. 11/747,222, filed May 10, 2007 (35 pgs).
U.S. Appl. No. 12/253,278, filed Oct. 17, 2008 (42 pgs).
U.S. Appl. No. 11/876,925, filed Oct. 23, 2007 (36 pgs).
U.S. Appl. No. 11/877,335, filed Oct. 23, 2007 (29 pgs).
U.S. Appl. No. 11/923,839, filed Oct. 25, 2007 (22 pgs).
U.S. Appl. No. 11/926,388, filed Oct. 29, 2007 (23 pgs).
U.S. Appl. No. 11/928,297, filed Oct. 30, 2007 (26 pgs).
U.S. Appl. No. 11/590,974, filed Oct. 31, 2006 (31 pgs).
U.S. Appl. No. 11/591,008, filed Oct. 31, 2006 (27 pgs).
U.S. Appl. No. 11/591,227, filed Oct. 31, 2006 (58 pgs).
U.S. Appl. No. 11/591,273, filed Oct. 31, 2006 (56 pgs).
U.S. Appl. No. 11/930,537, filed Oct. 31, 2007 (27 pgs).
U.S. Appl. No. 11/931,670, filed Oct. 31, 2007 (47 pgs).
U.S. Appl. No. 11/868,884, filed Oct. 8, 2007 (30 pgs).
U.S. Appl. No. 11/864,569, filed Sep. 28, 2007 (35 pgs).
U.S. Appl. No. 12/205,996, filed Sep. 8, 2008 (30 pgs).
U.S. Appl. No. 13/397,405, filed Feb. 15, 2012 (19 pgs).
Claims as filed on Apr. 3, 2008 for U.S. Appl. No. 12/062,163 (3 pgs).
Claims as filed on Apr. 3, 2008 for U.S. Appl. No. 12/062,175 (3 pgs).
Claims as filed on Aug. 19, 2010 for U.S. Appl. No. 12/859,752 (5 pgs).
Claims as filed on Dec. 15, 2011 for U.S. Appl. No. 13/327,478 (4 pgs).
Claims as filed on Dec. 20, 2006 for U.S. Appl. No. 11/613,671 (3 pgs).
Claims as filed on Dec. 8, 2010 for U.S. Appl. No. 12/963,513 (7 pgs).
Claims as filed on Feb. 16, 2011 for U.S. Appl. No. 13/028,477 (3 pgs).
Claims as filed on Jan. 20, 2011 for U.S. Appl. No. 13/010,644 (9 pgs).
Claims as filed on Jan. 31, 2011 for U.S. Appl. No. 13/017,865 (11 pgs).
Claims as filed on Mar. 15, 2007 for U.S. Appl. No. 11/686,925 (5 pgs).
Claims as filed on May 10, 2007 for U.S. Appl. No. 11/747,223 (4 pgs).
Claims as filed on May 18, 2011 for U.S. Appl. No. 13/110,077 (9 pgs).
Claims as filed on May 2, 2011 for U.S. Appl. No. 13/098,566 (10 pgs).
Claims as filed on Oct. 23, 2007 for U.S. Appl. No. 11/877,382 (6 pgs).
Claims as filed on Oct. 24, 2008 for U.S. Appl. No. 12/257,471 (4 pgs).
Claims as filed on Oct. 31, 2006 for U.S. Appl. No. 11/590,963 (3 pgs).
Claims as filed on Oct. 31, 2006 for U.S. Appl. No. 11/590,995 (3 pgs).
Claims as filed on Oct. 31, 2006 for U.S. Appl. No. 11/590,998 (4 pgs).
Claims as filed on Oct. 31, 2007 for U.S. Appl. No. 11/931,804 (4 pgs).
Claims as filed on Oct. 8, 2007 for U.S. Appl. No. 11/868,878 (4 pgs).
Claims as filed on Sep. 2, 2008 for U.S. Appl. No. 12/202,781 (4 pgs).
Claims as filed on Sep. 8, 2008 for U.S. Appl. No. 12/206,001 (3 pgs).
Claims as filed on Sep. 8, 2008 for U.S. Appl. No. 12/206,007 (3 pgs).
Claims as filed on Feb. 15, 2012 for U.S. Appl. No. 13/397,437 (6 pgs).
Claims as filed on Dec. 29, 2005 for U.S. Appl. No. 11/320,998 (3 pgs).
Claims as filed on Dec. 29, 2005 for U.S. Appl. No. 11/321,027 (3 pgs).

* cited by examiner

SYSTEMS AND METHODS OF CHECK RE-PRESENTMENT DETERRENT

CROSS-REFERENCE TO RELATED APPLICATIONS

This application is related by subject matter to that disclosed in the following commonly assigned applications, the entirety of which are hereby incorporated by reference herein: U.S. patent application Ser. No. 12/202,515, and U.S. patent application Ser. No. 12/202,749, each filed on even date and each entitled "Systems And Methods Of Check Re-Presentment Deterrent."

BACKGROUND

Currently, a user may deposit a check in a financial services institution either electronically using scanning and imaging techniques or physically by presenting the check at the financial services institution. Fraud occurs when a user presents the same check twice for deposit (e.g., once electronically and once physically, twice electronically, etc.). This may be referred to as check re-presentment.

Conventional techniques used to detect a re-presented or twice-deposited check rely on matching a deposit amount entered by the user when electronically depositing a check and a deposit amount obtained through character recognition technologies for a physically deposited check. Additional techniques compare magnetic ink character recognition (MICR) lines and/or account numbers. It is difficult to detect a check that is re-presented by a user. Such fraud may present a liability for the financial services institution.

SUMMARY

A user or a device may separate a check into two or more portions prior to generating a digital image of the check for remote deposit of the check. The user or a device may separate the check by cutting or tearing the check. After separating the check into the portions, the user may generate a digital image of the portions of the check using a scanner for example. The digital image may be transmitted to an institution for deposit of the check. The institution may retrieve the images of the portions of the check and generate an image of the check based on the portions, by combining the images of the portions for example. The image of the check that may be generated based on the images of the portions may be processed for deposit.

In an implementation, rather than combining the images of the portions to generate an image of the check, the institution may insert retrieved financial information from the portions into a check template for subsequent processing. In such an implementation, the portions of the images, though provided to the institution, are not combined by the institution.

In an implementation, rather than separating the check into two or more portions, the user may punch one or more holes or other marks in the check. The user may generate a digital image of the check having the hole(s) or mark(s) and transmit the digital image to an institution for deposit of the check. The institution may identify the hole(s) or mark(s) and process the check for deposit.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
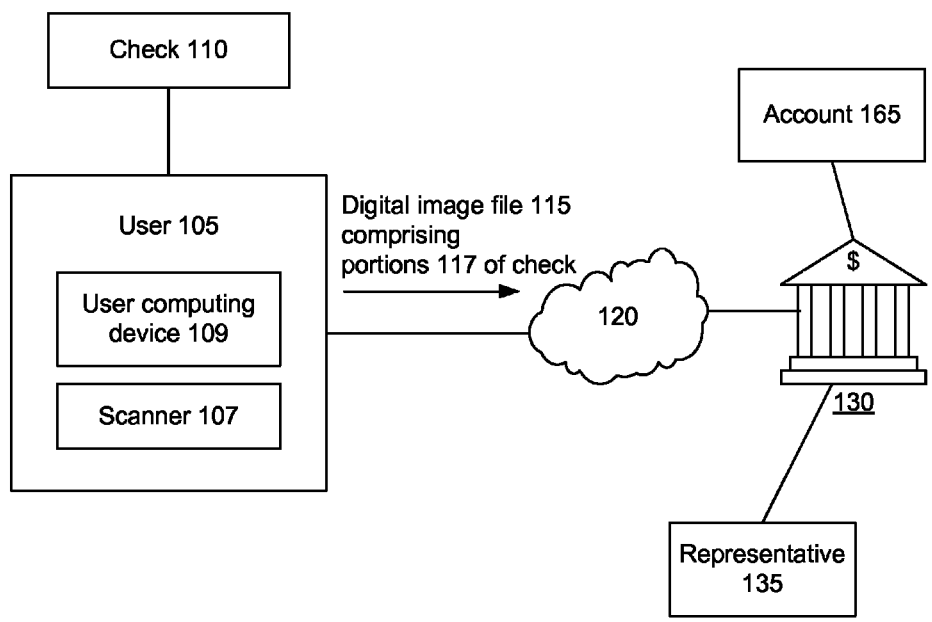
FIG. 1 is a block diagram of an implementation of a system in which example embodiments and aspects may be implemented.

FIG. 1 is a block diagram of an implementation of a system in which example embodiments and aspects may be implemented. The system 100 may include a user 105 and an institution 130, which may be any type of entity capable of processing checks and/or providing funds associated with checks. For example, the institution 130 may be a financial services institution such as a retail bank, an investment bank, an investment company, a regional branch of the Federal Reserve, a clearinghouse bank and/or a correspondent bank. A representative 135 of the institution 130 may provide assistance as described further herein.

The user 105 may be an individual or entity who owns an account 165 that may be held at the institution 130. The account 165 may be any type of account for depositing funds, such as a savings account, a checking account, a brokerage account, and the like. Although only one account 165 is shown, it is contemplated that the user 105 may have any number of accounts held at the institution 130. The user 105 may deposit a check 110 in the account 165 at the institution 130 either electronically or physically. The institution 130 may process and/or clear the check 110.

The user 105 may communicate with the institution 130 by way of a communications network 120 such as an intranet, the Internet, a local area network (LAN), a wide area network (WAN), a public switched telephone network (PSTN), a cellular network, a voice over Internet protocol (VoIP) network, and the like. The user 105 may also communicate with the institution 130 by phone, email, instant messaging, text messaging, facsimile, postal mail, and the like.

As described further herein, the user 105 may remotely electronically deposit the check 110 at the institution 130. It is noted that although examples and implementations described herein may refer to a check, the techniques and systems described herein are contemplated for, and may be used for, deposit of any negotiable instrument, such as a money order, a cashier's check, a check guaranteed by a bank, or the like.

The user 105 may access the institution 130 by opening a communication pathway via the communications network 120 using a user computing device 109. There may be several ways in which the communication pathway may be established, including, but not limited to, an Internet connection via a website of the institution 130. The user 105 may access the website and log into the website using credentials, such as, but not limited to, a username and a password.

The user 105 may use a scanner 107 to generate a digital image of the check 110. The digital image may be used to create a digital image file 115 that may be sent to the institution 130 and used by the institution 130 to process a deposit of the check 110. In an implementation, the digital image file 115 may be augmented by secondary data which may be information relating to the deposit of the check 110, such as an account number and a deposit amount, for example.

In an implementation, the user 105 may separate the check 110 into two or more portions 117 prior to generating a digital image of the check 110 for remote electronic deposit of the check 110. The user 105 may separate the check 110 by cutting or tearing the check 110, for example. In an implementation, the check 110 may be cut or torn along the longitudinal axis. The check 110 may be cut or torn so as to avoid or otherwise not affect the magnetic ink character recognition (MICR) number (e.g., the MICR number will be completely on one portion and a cut or tear will not be made through the MICR number). In an implementation, a device may receive the check 110 and may perform the separating (e.g., by cutting or tearing) pursuant to receiving instructions from the user 105 or the user computing device 109. Such a device may be integrated into the user computing device 109, the scanner 107, or may be separate therefrom.

After separating the check 110 into two or more portions 117, the user 105 may generate a digital image of the portions 117, using the scanner 107 for example. The portions 117 of the check 110 may be positioned on the scanner 107 with space left between the portions 117. For example, after endorsing the check 110 and separating the check 110 into portions 117, the user 105 may use a device such as the scanner 107 and/or the user computing device 109 for example, to convert the portions 117 of the check 110 into a digital image file 115 by making a digital image of the front sides and/or back sides of the portions 117 of the check 110 and storing the digital image(s) in a digital image file 115.

The digital image of the portions 117 may be transmitted to the institution 130 as a digital image file 115. The user 105 may send the digital image file 115 and any secondary data to the institution 130 along with a request to deposit the check 110 into an account, such as the account 165. The institution 130 may process the deposit request according to the digital image file 115 and any secondary data. Thus, as described further herein, the institution 130 may process the digital image file 115 comprising the images of the portions 117 of the check 110 for deposit.

The institution 130 may retrieve the images of the portions 117 of the check 110 from the digital image file 115 and generate an image of the check 110 based on the portions 117, by combining the images of the portions 117 to create an image of the check 110. The image of the check 110 that may be generated based on the images of the portions 117 may be processed for deposit. Any image processing technology may be used to retrieve the images of the portions 117 of the check 110 from the digital image file 115 and combine the portions 117 into an image of the check 110 that may be processed for deposit. In an implementation, certain points or features (e.g., MICR number, "$" sign, signature line, courtesy amount line, legal amount line, etc.) of the check 110 may be identified and used in lining up or otherwise arranging the portions 117 of the check 110 as they are combined into an image. It is contemplated that any points, coordinates, features, or regions of interest on a negotiable instrument may be used with the techniques described herein. Alternatively or additionally, edge detection may be used to identify the edges of the portions 117 and align the portions 117 for combination into an image of the check 110. Any known edge detection technique may be used.

Upon receipt and processing of the digital image file 115 and approval of the check generated therefrom, the institution 130 may credit the funds of the check 110 to the account 165. It will be appreciated that the examples herein are for purposes of illustration and explanation only, and that an embodiment is not limited to such examples.

In an implementation, the user 105 may attach the digital image file 115 to an email and send the digital image file 115 to the institution 130 using the same device used to make the digital image of the portions 117 of the check 110 and/or convert the portions 117 of the check 110 into the digital image file 115, or another computing device. However, any technique for sending a digital image file 115 to the institution 130 may be used, such as providing a digital image file 115 from storage to a website associated with the institution 130.

The user computing device 109 may be integral with the device used to make the digital image and/or the digital image file 115 or separate from the device used to make the digital image and/or the digital image file 115. An example user computing device 109 is described with respect to FIG. 6. It is contemplated that any device that is capable of generating a digital image may be used to make a digital image of the portions 117 of the check 110 which may be sent to the institution 130 as a digital image file 115. Additional devices that may be used in the generation and/or transmission of a digital image file 115 include a digital camera, a photocopier, a fax machine, and the like, for example.

The institution 130 may receive a digital image file 115 representing the portions 117 of the check 110 and may use any known image processing software or other application(s) to obtain the relevant data of the check 110 from the digital image file 115. The institution 130 may determine whether the financial information associated with the check 110 may be valid.

For example, the institution 130 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the financial information and may receive the digital image file 115 from the user 105.

The electronic devices may receive the digital image file 115 and may perform an initial analysis on the quality of the image of the portions 117 of the check 110 in the digital image file 115, the readability of the data contained therein, or the like. For example, the electronic devices may determine whether the portions 117 may be retrieved and combined and whether the amount payable and other information may be readable such that it may be obtained and processed by the institution 130 to credit the account 165 associated with the user 105.

Because the check 110 is separated into two or more portions 117 by the user 105, it is more difficult for the user 105 to re-present the check 110 for deposit. Also, the institution 130 may more easily detect a re-presentment. Thus, the user 105 may be deterred from re-presenting the check 110. Although an institution may take a check that is separated into multiple portions, it may become questionable and initiate a warning to the institution to more carefully scrutinize the check and the deposit. This may also act as a deterrent to re-presentment. In an implementation, the check 110 may be considered to be "destroyed" before being scanned by the user 105 and image processing may be used by the institution 130 to combine the portions 117 of the check 110 for subsequent processing and deposit.

Figure 2:
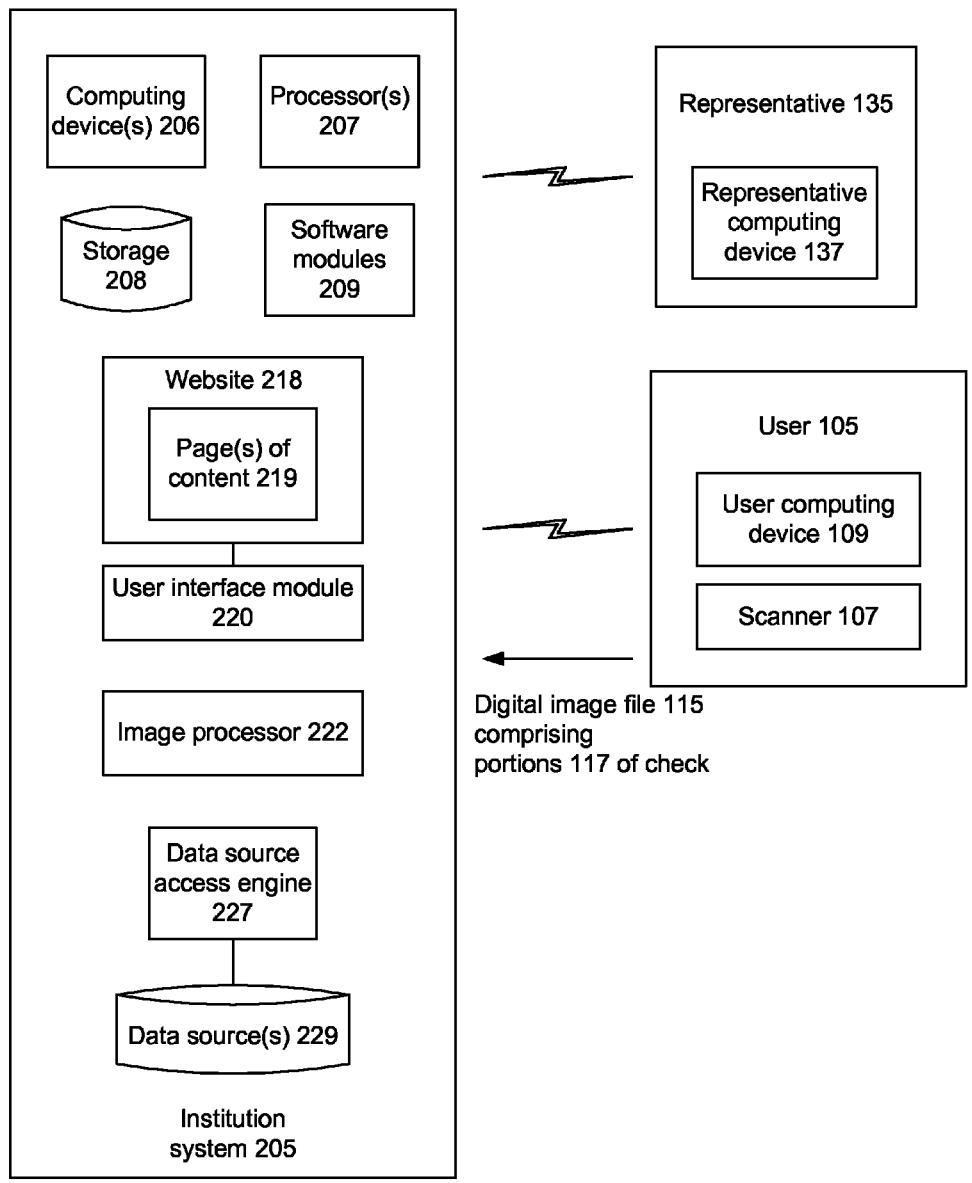
FIG. 2 is a block diagram of an implementation of a system that may be used to deter check re-presentment.

FIG. 2 is a block diagram of an implementation of a system that may be used to deter check re-presentment. An institution system 205 may be associated with the institution 130 and may include a user interface module 220, an image processor 222, and a data source access engine 227. The user interface module 220 may generate and format one or more pages of content 219 as a unified graphical presentation that may be provided to the user computing device 109 or a representative computing device 137. In an implementation, the page(s) of content 219 may be provided to the user computing device 109 and/or the representative computing device 137 via a secure website 218 associated with the institution system 205.

In an implementation, the institution system 205 may use the image processor 222 to process the digital image file 115 comprising the portions 117 of the check 110 received from the user 105 and to generate a digital image (also referred to herein as an image) of the check 110 that may be used by the institution 130 in the processing and/or clearance of the check 110. The image processor 222 may process multiple frames of the image if the image is comprised of multiple frames.

For example, after receiving the digital image file 115 of the check 110, the image processor 222 may retrieve the images of the portions 117 of the check 110 and generate an image of the check 110 by identifying and isolating the portions 117 and combining the portions 117 into an image that may be processed for deposit. The image processor 222 may use any known image processing software or other application(s) to obtain the portions 117 and any relevant data of the check 110 from the digital image file 115.

The image processor 222 has access to data, files, and documents pertaining to the user 105 as well as any other data, files, and documents that are internal or external to the institution system 205 that may be useful in processing the digital image file 115 and/or the data contained therein.

The institution system 205 has the ability to retrieve information from one or more data sources 229 via the data source access engine 227. Data pertaining to the user 105 and/or the user account 165 and/or processing and clearing of a check may be retrieved from data source(s) 229 and/or external data sources. The retrieved data may be stored centrally, perhaps in storage 208. Other information may be provided to the institution system 205 from the user 105 and/or the representative 135.

Data source(s) 229 may contain data, metadata, email, files, and/or documents that the institution system 205 maintains pertaining to the user 105, such as personal data such as name, physical address, email address, etc. and financial data such as credit card numbers and checking account numbers. Such data may be useful for processing the digital image file 115 comprising portions 117 of the check 110 as described herein. Additionally or alternatively, the institution system 205 may access this information when processing or clearing a check.

The representative computing device 137 may provide access to a system which is coupled to the institution system 205. A system may be configured to format and transmit a graphical user interface to the representative 135, and through the graphical user interface provide the representative 135 the ability to interact with information that may be maintained, requested, and/or provided by the institution system 205. As mentioned above, the institution system 205 may provide a unified graphical presentation output. In an implementation, the unified graphical presentation is combined with other materials and transmitted to the representative 135.

A user access system may be implemented as a web server in an implementation. The user access system, through the use of any suitable interactive web technology, provides an interactive experience to the user 105 and/or the representative 135 through which access to check processing and clearing data and status and related data can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 205 may comprise one or more computing devices 206. The computing device(s) 206 may have one or more processors 207, storage 208 (e.g., storage devices, memory, etc.), and software modules 209. The computing device(s) 206, including processor(s) 207, storage 208, and software modules 209, may be used in the performance of the techniques and operations described herein.

Examples of software modules 209 may include modules that may be used in conjunction with receiving and processing a digital image file 115 comprising portions 117 of the check 110, generating an image of the check 110 based on the portions 117, retrieving data from the digital image file 115, generating web page content for display, and receiving instructions from the representative 135 or the user 105, for example. While specific functionality is described herein as occurring with respect to specific modules, the functionality may likewise be performed by more, fewer, or other modules. An example computing device and its components are described in more detail with respect to FIG. 6.

Figure 3:
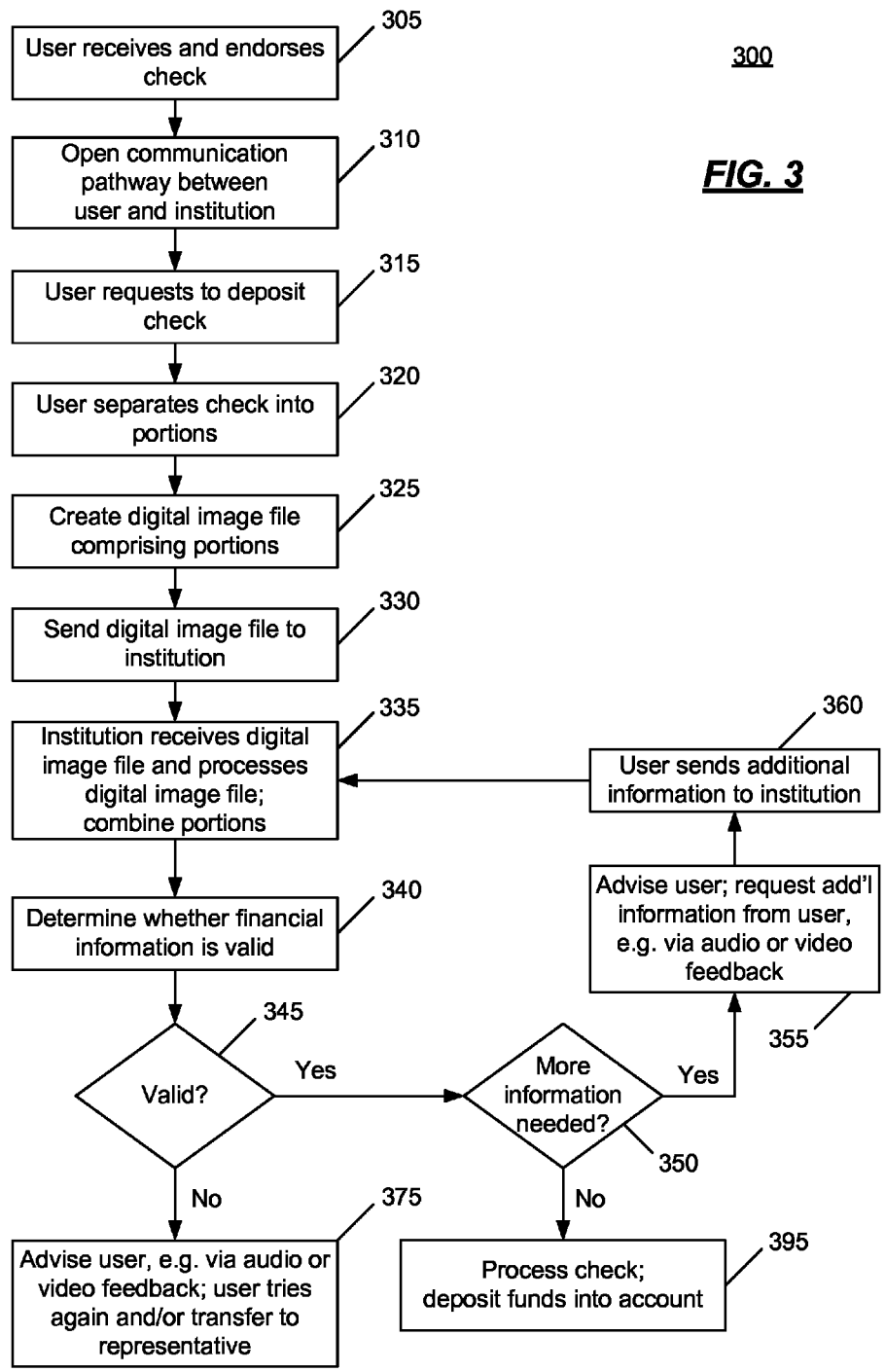
FIG. 3 is an operational flow of an implementation of a method that may be used to deter check re-presentment.

FIG. 3 is an operational flow of an implementation of a method 300 that may be used to deter check re-presentment. At 305, an account owner (i.e., the payee, referred to herein as a user) may receive a check from a third party (i.e., the payor) and may endorse the check by signing the back of the check in the designated field. If the user wishes to deposit the check into an account, such as a savings and/or checking account, they also may write an account number below the signature.

At 310, the user may open a communication pathway with an institution that may be associated with an account for depositing funds by logging into a website of the institution, for example. There may be several ways in which a communication pathway may be established, including, but not limited to, an Internet connection via a website of the institution. The user may access the website and log into the website using credentials, such as, but not limited to, a username and a password.

At 315, the user may send a request to deposit the check and may select an account in which to deposit the check. In an implementation, the user may select a "deposit check" option provided on the website, and may enter details such as check amount, date, the account the check funds should be deposited in, comments, etc.

At 320, the user may separate the check into two or more portions, e.g., by cutting or tearing the check. In an implementation, the institution may provide the user with instructions regarding the separation of the check, such as where to cut or tear the check (e.g., along the longitudinal axis, so as to avoid or not affect the MICR number, etc.). In an implementation, the check may comprise a pre-printed line as a guide along which the user may cut or tear the check.

At 325, a digital image file of the portions of the check may be created. There may be several ways in which to create a digital image file of the portions of the check, including, but not limited to, a scanner, a digital camera, and/or a personal computer (PC). In an implementation, the user may scan or otherwise create a digital image file comprising the front side of each of the portions of the check and the back side of each of the portions of the check.

In an implementation, the user may use a template (e.g., provided by the institution) to arrange the portions of the check for scanning. In this manner, the image of the portions in the digital image file may comprise the portions in a predetermined position or arrangement that may be easier for the institution to identify and/or process.

Alternatively, the user may insert the portions of the check into a holder (e.g., provided by the institution). The portions may be inserted in the holder in a predetermined position or manner. For example, the portions of the check or features of the portions of the check such as one or more corners of the check, the signature line, the MICR line, etc., may be aligned with respect to one or more markings or indicators on the holder. It is contemplated that different holders may be used for the front side portions of the check and for the back side portions of the check. The positioning or alignment may allow for more efficient processing of the check by the institution.

The digital image file may be sent to the institution for processing at 330. The digital image file may be sent using various means, including, but not limited to, an Internet connection via the website or a cellular transmission. Additionally, the digital image file may be augmented by secondary data which may be information relating to the check, such as an account number, a deposit amount, or a routing number associated with the check, and/or relating to the account for depositing funds, such as the account number and/or the name on the account. The secondary data may be provided to the institution via an image file, an email, a facsimile, instant message, text message, or selection via a website associated with the institution (e.g., after the user opens a communication pathway with the institution, before or after the user sends the digital image file of the portions of the check or other negotiable instrument to the institution, etc.), for example.

At 335, the institution may receive the digital image file of the portions of the endorsed check (along with financial information pertaining to the account for depositing funds and any secondary data in an implementation) and may process the digital image file. Processing of the digital image file may include retrieving the portions of the check, combining the portions to generate an image of the check to be deposited, and/or retrieving financial information regarding the check. Any known image processing technology may be used, such as edge detection, filtering to remove imagery except the portions of the check in the received digital image file, image sharpening, and technologies to distinguish between the front and the back sides of the check. The institution may identify and/or remove at least a portion of data that is extraneous to the check, such as background and/or holder data. The holder, or markings or indicators on the holder, may be used in the identification of data that is extraneous to the check and which may be removed by the institution.

In an implementation, the institution may determine that there are multiple user accounts in which to deposit the check. The accounts may be the same type of account, such as a checking account, or different types of accounts, such as checking, savings, or investment accounts. The user may make a selection among a list of accounts in which to deposit the check. The selection may be transmitted to the institution, which may process the deposit request, the secondary data if any, and the selected account.

At 340, the institution may determine whether the financial information received from the digital image file may be readable and valid. Retrieved information may include the amount payable to the user, the account associated with the user to deposit funds, an account associated with a payor to debit funds, and an institution associated with the payor and/or the user. For example, the institution may include electronic devices such as computers, servers, databases, or the like that may be in communication with each other. The electronic devices may receive an electronic data representation and may perform an initial analysis on the quality of the data representation, the readability of the data representation, or the like. For example, the electronic devices may determine whether the account number, amount payable, or the like may be readable such that they may be parsed and processed by the institution to credit an account associated with the user and debit an account associated with the payor. In an implementation, the institution may check that that the resolution of the image meets at least a predetermined threshold, such as 200 dots per inch (dpi), 400 dpi, 500 dpi, etc.

In an implementation, after retrieving the financial information from the check in an electronic data representation form, the institution may determine whether the financial information such as the amount payable to the user, the account associated with the user to deposit funds, an account associated with a payor to debit funds, and an institution associated with the payor, etc. may be valid.

At 345, if the financial information is determined to be valid, it may be determined at 350 if more information is needed from the user before depositing the check. Such information may include data from another side of the check (e.g., the back of the check, the front of the check, or some other information). If no additional information is needed at 350, the electronic data representation may be processed by the institution at 395, thereby depositing the check in the user's account. The user may receive a notice via email, facsimile, instant message or mail, for example, that the check has been deposited into the appropriate account selected by the user.

In an implementation, at 395, the institution may process the electronic data representation of the check. For example, the institution may credit the funds to an account associated with the user if the financial information is valid. The credit may be a provisional credit, enabling the user to access the funds while the check is being cleared. A provisional credit may be voided if the bank determines that the transaction is erroneous and/or fraudulent. Additionally, to credit funds to the account, the bank may generate an Automated Clearinghouse (ACH) debit entry, substitute check, and/or electronic image. ACH transactions typically include payment instructions to debit and/or credit an account. Banks often employ ACH service providers to settle ACH transactions. Examples of ACH service providers include regional branches of the Federal Reserve and the Electronic Payments Network (EPN).

The ACH service provider may process the debit entry by identifying the account and bank from which the check may be drawn. The bank from which the check is drawn (i.e., the payor's bank) may be referred to as a receiving depository financial institution (RDFI). If the payor's bank verifies the transaction, the ACH service provider may settle the transaction by debiting the payor's bank and crediting the user's bank. The payor's bank may then debit the payor's account.

If more information is needed from the user before depositing the check as determined at 350, the user may be advised at 355 and additional information may be requested from the user. The user may be advised by an email, a web message, an instant message, a text message, or the like transmitted from the institution to the user. In an implementation, audio or video feedback may be provided to the user providing status information and/or requesting additional information. The user may send the requested additional information at 360. In an implementation, processing may continue at 335.

If the financial information is determined to be invalid at 345, then the user may be advised at 375. For example, the institution may transmit an email, a web message, an instant message, a text message, or the like to the user indicating that the financial information associated with the electronic data representation may be invalid. In an implementation, audio or video feedback may be provided to the user about image quality and may direct the user on what they may do to provide a good image of the portions of the check or other negotiable instrument for deposit.

The user may determine how to proceed by selecting an option on the message, replying to the email, or the like. In an implementation, if the financial information is held to be invalid, instructions on how the user would like to proceed may be requested from the user, such as whether the user would like to try the electronic deposit again or whether the user would like assistance from a representative, for example. The institution may also provide additional options to the user on how to redeem the check such as mailing the check to the institution or the like. The user may indicate how they would like to proceed. Thus, in an implementation, the user may try generating a digital image file of portions of the check again and sending it to the institution again (e.g., processing may continue at 330) and/or may be transferred to a representative of the institution for assistance.

If the user would like assistance, the financial information may be transferred to a representative for further review. The representative, such as a customer service representative, a bank teller that may be located at a branch, a virtual bank teller that may be located remotely via an electronic device, or the like, may review the financial information associated with the electronic data representation to determine whether to allow the electronic data representation to be processed by the institution. For example, the initial analysis may require a certain quality requirement, a certain readability requirement, or the like, thus, leading to a high failure rate even though the electronic data representation may otherwise be valid. Thus, the representative may review the electronic data representation to determine whether the financial information may be readable and/or of a good enough quality to be processed. If so, the electronic data representation of the financial information may be processed by the institution, thereby depositing the check in the user's account.

In an implementation, the institution may receive a decision from a representative on whether to credit the funds to an account. For example, a representative such as a virtual teller may make a decision such as to approve or deny processing of the electronic data representation. According to an embodiment, a virtual teller may fill in invalid financial information. For example, the virtual teller may issue a decision to approve the electronic data representation and may fill in the financial information deemed invalid from the initial analysis based upon inspection or review by the teller. The institution may then receive the invalid information from the virtual bank teller such that the electronic data representation may be processed.

Figure 4:
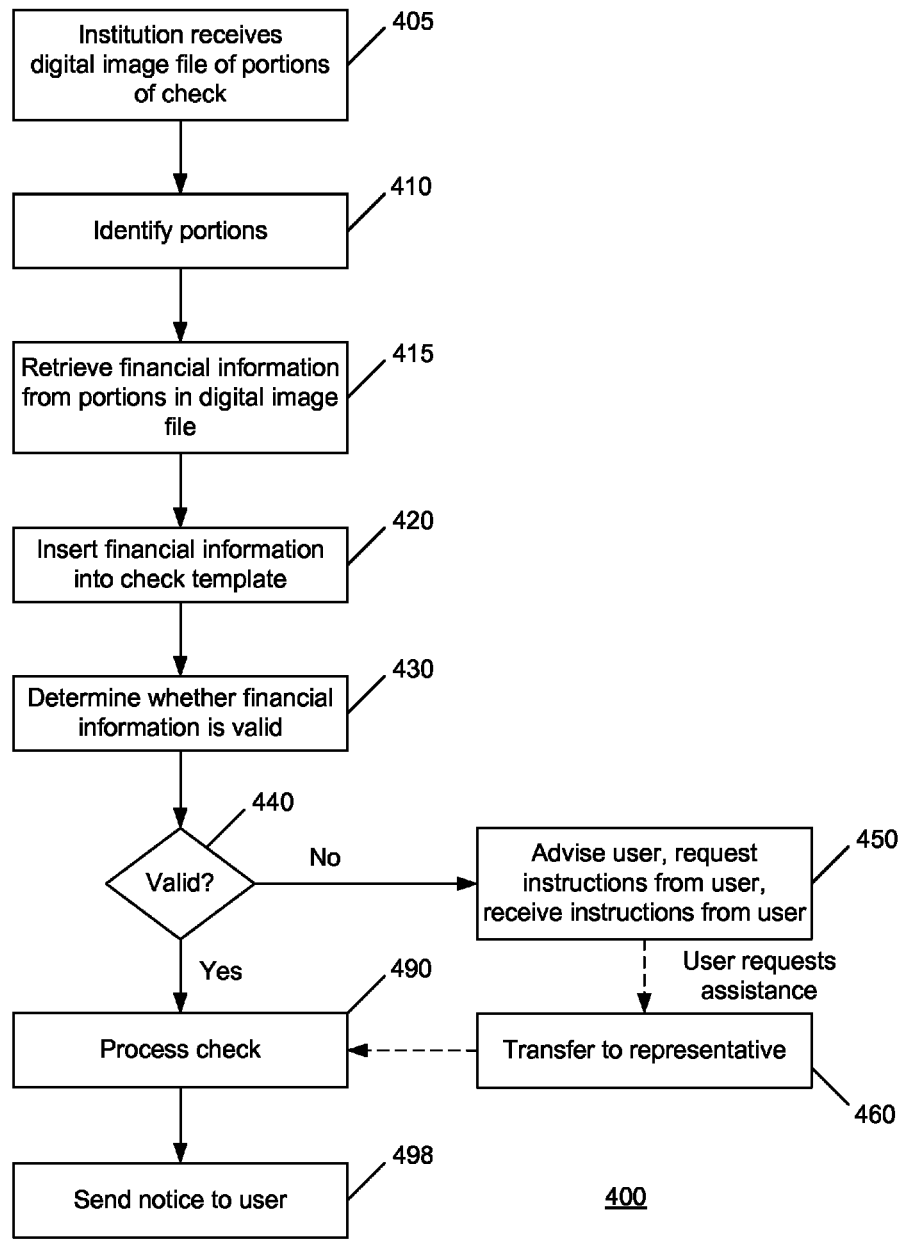
FIG. 4 is an operational flow of another implementation of a method that may be used to deter check re-presentment.

FIG. 4 is an operational flow of another implementation of a method 400 that may be used to deter check re-presentment. At 405, the institution may receive a digital image file, comprising one or more digital images of portions of a check, from a user who may have one or more accounts held by the institution. In an implementation, the digital image file may be received by email, via a website, or via a cellular transmission.

The institution may open the digital image file and process the digital image(s) using any known technology. In an implementation, at 410, the institution may identify the portions and, without combining the portions, at 415, may retrieve financial information from the portions. The financial information may comprise the MICR number, the routing number, an amount, etc.

At 420, the retrieved financial information may be inserted into a check template by the institution for subsequent processing. It is noted that the insertion of the retrieved financial information into a check template is optional and may or may not be used, depending on the processing implementation used.

At 430, after retrieving the financial information from the check in an electronic data representation form, the institution may determine whether the financial information such as the amount payable to the user, the account associated with the user to deposit funds, etc., may be valid. For example, the institution may include electronic devices such as computers, servers, databases, or the like that may be in communication with each other. The electronic devices may receive an electronic data representation and may perform an initial analysis on the quality of the data representation, the readability of the data representation, or the like. For example, the electronic devices may determine whether the account number, amount payable, or the like may be readable such that they may be parsed and processed by the institution to credit an account associated with the user.

At 440, if the financial information is determined to be valid, the electronic data representation may be processed by the institution at 490, thereby depositing the money in the user's account.

If the financial information is determined to be invalid at 440, then the user may be advised at 450. For example, the institution may transmit an email, a web message, an instant message, or the like to the user indicating that the financial information associated with the electronic data representation may be invalid. The user may determine how to proceed by selecting an option on the web message, replying to the email, or the like.

Thus, in an implementation, instructions on how the user would like to proceed may be requested from the user, such as whether the user would like to try the deposit again (e.g., make another digital image file and send it to the institution) or whether the user would like assistance from a representative, for example. The user may indicate how they would like to proceed.

If the user would like assistance, the financial information may be transferred to a representative for further review at 460. The representative may review the financial information associated with the electronic data representation to determine whether to allow the electronic data representation to be processed by the institution. If so, the electronic data representation of the financial information may be processed by the institution at operation 490, thereby depositing the check in the user's account.

At 498, the institution may send a notice to the user via email, facsimile, instant message, or mail, for example, that the check has been deposited into the selected account.

Figure 5:
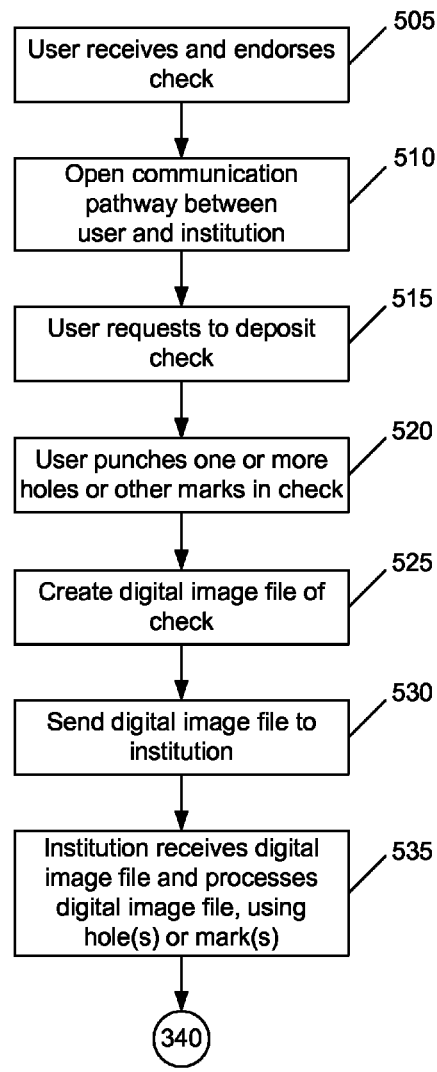
FIG. 5 is an operational flow of another implementation of a method that may be used to deter check re-presentment.

FIG. 5 is an operational flow of another implementation of a method 500 that may be used to deter check re-presentment. Similar to the method 300, the user may receive and endorse a check at 505, open a communication pathway with an institution at 510, and request to deposit the check at 515. These operations are similar to those described at 305, 310, and 315, respectively, and their further descriptions are omitted for brevity.

At 520, the user may punch one or more holes or other marks in the check, e.g., by using a hole punch or other device. In an implementation, the one or more holes or other marks may be made in a predetermined location on the check (e.g., as determined by the user or the institution), an approximate location on the check, or wherever the user chooses on the check. In an implementation, the hole punch or other device may be provided by the institution. For example, the hole(s) or other mark(s) may be made near a feature or point on the check, such as the MICR number, the "$" sign, etc. In an implementation, the check may comprise a pre-printed indicator to guide the user as to where to make the holes(s) or other marks(s).

At 525, a digital image file of the check may be created using a scanner, a digital camera, and/or a PC for example. In an implementation, the user may scan or otherwise create a digital image file comprising the front side and the back side of the check. At 530, similar to 330, the user may send the digital image file to the institution for processing.

At 535, the institution may receive the digital image file of the endorsed check (along with financial information pertaining to the account for depositing funds and any secondary data in an implementation) and may process the digital image file. Processing of the digital image file may include identifying the one or more holes or other marks of the check and retrieving financial information regarding the check. In an implementation, the hole(s) or mark(s) may be used to align the check and/or locate certain financial information on the check. For example, if the user places a hole at each of three corners of the check, such information may be used to locate the fourth corner of the check. As another example, if the user places a hole at the "$" sign, the image processor may use this information in determining the position of the MICR number. Any known image processing technology may be used, such as edge detection, filtering to remove imagery except the check in the received digital image file, image sharpening, and technologies to distinguish between the front and the back sides of the check. The institution may identify and/or remove at least a portion of data that is extraneous to the check. The hole(s) or mark(s) may be used in the identification of data that is extraneous to the check and which may be removed by the institution.

Processing may continue with the check being processed and deposited using techniques described with respect to the method 300, for example. In an implementation, processing may proceed as described with respect to the method 300, e.g., at 340 with a determination of whether the financial information from the check is readable and valid.

Because the check has one or more holes or other marks that have been made by the user, it is more difficult for the user to re-present the check, and the institution may more easily detect a re-presentment. Thus, the user may be deterred from re-presenting the check.

Although the examples described herein may refer to separating a check into portions or making one or more holes or marks in a check prior to electronically presenting the check for deposit, it is contemplated that any negotiable instrument may be processed using the techniques described herein.

Exemplary Computing Arrangement

Figure 6:
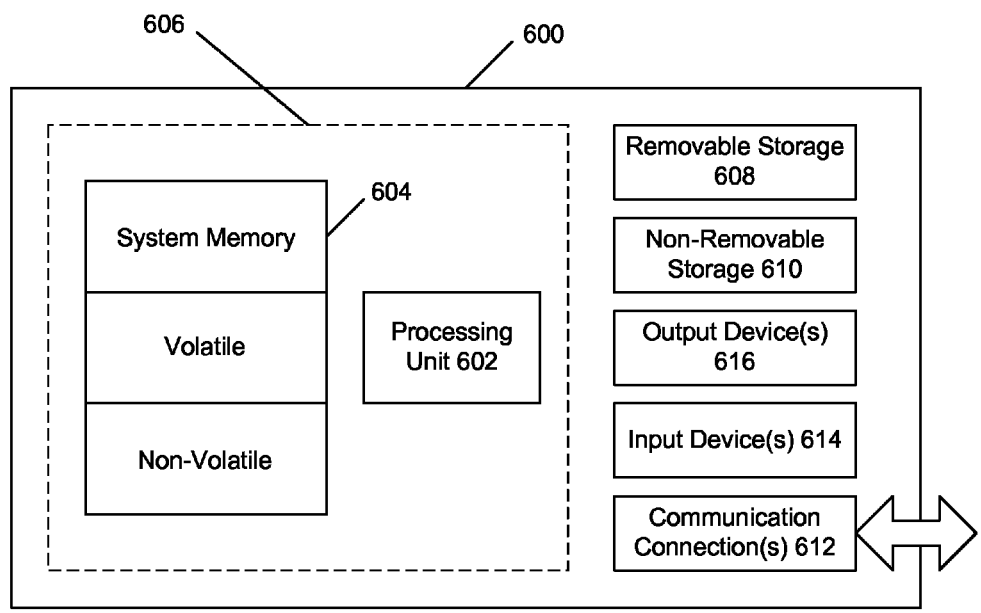
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as RAM), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for depositing a negotiable instrument, comprising:
   with a processor in communication with a financial institution:
      receiving an image of a plurality of portions of the negotiable instrument, wherein the received image depicts the negotiable instrument physically separated into the plurality of portions;
      processing the image of the plurality of portions to combine the plurality of portions into an image of the negotiable instrument; and
      depositing funds of the negotiable instrument into an account based on the image of the negotiable instrument.

2. The method of claim 1, wherein the image of the plurality of portions of the negotiable instrument is received via an Internet connection or a cellular transmission from a user, the account being associated with the user.

3. The method of claim 2, wherein receiving the image of the plurality of portions of the negotiable instrument comprises receiving a digital image file comprising the image of the plurality of portions, the digital image file being created by the user using a scanner or a camera.

4. The method of claim 1, wherein the negotiable image comprises a check and one of the plurality of portions of the negotiable instrument comprises a magnetic ink character recognition (MICR) number of the check.

5. The method of claim 1, wherein processing the image of the plurality of portions comprises identifying the portions, isolating the portions, and combining the portions into the image of the negotiable instrument.

6. The method of claim 1, wherein processing the image of the plurality of portions comprises identifying at least one feature of the negotiable instrument in at least one of the portions, and aligning the portions based on the at least one feature.

7. The method of claim 1, wherein processing the image of the plurality of portions comprises using edge detection to identify at least one edge of each of the portions and combining the portions based on the at least one edge of each of the portions.

8. A non-transitory computer-readable medium comprising computer-readable instructions for depositing a negotiable instrument, said computer-readable instructions comprising instructions that cause an image processor to:
   electronically receive an image of a plurality of portions of the negotiable instrument, wherein the received image depicts the negotiable instrument physically separated into the plurality of portions;
   electronically process the image of the plurality of portions to combine the plurality of portions into an image of the negotiable instrument; and
   electronically identify funds of the negotiable instrument to deposit into an account based on the image of the negotiable instrument.

9. The non-transitory computer-readable medium of claim 8, wherein the image of the plurality of portions of the negotiable instrument is received via an Internet connection or a cellular transmission from a user, the account being associated with the user.

10. The non-transitory computer-readable medium of claim 9, wherein the instructions that cause the image processor to receive the image of the plurality of portions of the negotiable instrument comprise instructions that cause the image processor to receive a digital image file comprising the image of the plurality of portions, the digital image file being created by the user using a scanner or a camera.

11. The non-transitory computer-readable medium of claim 8, wherein the negotiable image comprises a check and one of the plurality of portions of the negotiable instrument comprises a magnetic ink character recognition (MICR) number of the check.

12. The non-transitory computer-readable medium of claim 8, wherein the instructions that cause the image processor to process the image of the plurality of portions comprise instructions that cause the image processor to identify the portions, isolate the portions, and combine the portions into the image of the negotiable instrument.

13. The non-transitory computer-readable medium of claim 8, wherein the instructions that cause the image processor to process the image of the plurality of portions comprise instructions that cause the image processor to identify at least one feature of the negotiable instrument in at least one of the portions, and align the portions based on the at least one feature.

14. The non-transitory computer-readable medium of claim 8, wherein the instructions that cause the image processor to process the image of the plurality of portions comprise instructions that cause the image processor to use edge detection to identify at least one edge of each of the portions and combine the portions based on the at least one edge of each of the portions.

15. A system for depositing a negotiable instrument, comprising:
   a memory; and
   an image processor in communication with the memory, the image processor configured to:
      electronically receive an image of a plurality of portions of the negotiable instrument, wherein the received image depicts the negotiable instrument physically separated into the plurality of portions;
      electronically process the image of the plurality of portions to combine the plurality of portions into an image of the negotiable instrument; and
      electronically identify funds of the negotiable instrument to deposit into an account based on the image of the negotiable instrument.

16. The system of claim 15, wherein the image of the plurality of portions of the negotiable instrument is received via an Internet connection or a cellular transmission from a user, the account being associated with the user.

17. The system of claim 16, wherein electronically receiving the image of the plurality of portions of the negotiable instrument comprises electronically receiving a digital image file comprising the image of the plurality of portions, the digital image file being created by the user using a scanner or a camera.

18. The system of claim 15, wherein the negotiable image comprises a check and one of the plurality of portions of the negotiable instrument comprises a magnetic ink character recognition (MICR) number of the check.

19. The system of claim 15, wherein electronically processing the image of the plurality of portions comprises electronically identifying the portions, electronically isolating the portions, and electronically combining the portions into the image of the negotiable instrument.

20. The system of claim 15, wherein electronically processing the image of the plurality of portions comprises electronically identifying at least one feature of the negotiable instrument in at least one of the portions, and electronically aligning the portions based on the at least one feature.

21. The system of claim 15, wherein electronically processing the image of the plurality of portions comprises electronically using edge detection to identify at least one edge of each of the portions and electronically combining the portions based on the at least one edge of each of the portions.

* * * * *